(12) United States Patent
Tikhonova et al.

(10) Patent No.: US 12,164,499 B2
(45) Date of Patent: Dec. 10, 2024

(54) FEDERATED SERVICES ARCHITECTURE THAT ENABLES INTEGRATING EXTERNAL SYSTEMS INTO A SELF-DESCRIBING DATA MODEL

(71) Applicant: ARAS CORPORATION, Andover, MA (US)

(72) Inventors: Alexandra Tikhonova, Minsk (BY); Nicholas Pascarella, Irvine, CA (US); Valentsin Shapavalau, Minsk (BY)

(73) Assignee: Aras Corporation, Andover, MA (US)

( * ) Notice: Subject to any disclaimer, the term of this patent is extended or adjusted under 35 U.S.C. 154(b) by 49 days.

(21) Appl. No.: 17/835,587

(22) Filed: Jun. 8, 2022

(65) Prior Publication Data

US 2022/0405267 A1    Dec. 22, 2022

Related U.S. Application Data

(60) Provisional application No. 63/209,185, filed on Jun. 10, 2021.

(51) Int. Cl.
| | |
|---|---|
| *G06F 16/23* | (2019.01) |
| *G06F 16/21* | (2019.01) |
| *G06F 16/28* | (2019.01) |

(52) U.S. Cl.
CPC ........ *G06F 16/2358* (2019.01); *G06F 16/289* (2019.01); *G06F 16/211* (2019.01)

(58) Field of Classification Search
CPC .. G06F 16/2358; G06F 16/289; G06F 16/211; G06F 16/24542; G06F 16/24535
See application file for complete search history.

(56) References Cited

U.S. PATENT DOCUMENTS

| | | | |
|---|---|---|---|
| 2005/0149552 A1* | 7/2005 | Chan | G06F 16/211 707/999.102 |
| 2011/0066668 A1* | 3/2011 | Guarraci | G06F 16/188 707/831 |
| 2014/0365531 A1* | 12/2014 | Soundararajan | G06F 16/28 707/798 |
| 2015/0040225 A1* | 2/2015 | Coates | H04L 63/1433 726/23 |
| 2016/0140197 A1* | 5/2016 | Gast | H04L 67/1095 707/626 |
| 2020/0244680 A1* | 7/2020 | Brandel | G06F 9/544 |

* cited by examiner

*Primary Examiner* — Cam Y T Truong
(74) *Attorney, Agent, or Firm* — Dickinson Wright PLLC; Stephen A. Mason; Jonathan H. Harder

(57) ABSTRACT

In one embodiment, a computing device includes a memory device storing instructions, and a processing device communicatively coupled to the memory device. The processing device executes the instructions to execute a computer-implemented system configured to manage items in a self-describing data model, and generate a representation of a federated system in the self-describing data model. The representation includes logical model items having logical model item types associated with data in an external object model used by a third-party computer-implemented system. The processing device may enable communication of the items and the logical model items between a client computer-implemented system and the third-party computer-implemented system.

17 Claims, 34 Drawing Sheets

FIG. 1

<Item type = "Part" id="ABCDEF012345" action="get"/>
　　　105　　　　　　　　110　　　　　　　　115

```xml
<?xml version="1.0"?>
<AML>
    <Item action="qry_ExecuteQueryDefinition" type="qry_QueryDefinition">    ⎫
        <root_query_item_ref_id>part_1</root_query_item_ref_id>              ⎬ 705
        <name>UseCase_1</name>                                                ⎭
        <Relationships>
            <Item type="qry_QueryCondition">                                  ⎫
                <condition_xml>                                               ⎪
                    <![CDATA[<condition> <eq> <property ref-id="TopPart_id_GUID"/> <property ref-
                    id="PBom_sourceId_GUID"/> </eq> </condition> ]]>          ⎬ 710a
                </condition_xml>                                              ⎪
                <ref_id>join_cond_1</ref_id>                                  ⎭
            </Item>
            <Item type="qry_QueryCondition">                                  ⎫
                <condition_xml>                                               ⎪
                    <![CDATA[<condition> <eq> <property ref-id="PBom_relatedId_GUID"/> <property ref-
                    id="RelPart_id_GUID"/> </eq> </condition> ]]>             ⎬ 710b
                </condition_xml>                                              ⎪
                <ref_id>join_cond_2</ref_id>                                  ⎭
            </Item>
            <Item type="qry_QueryCondition">                                  ⎫
                <condition_xml>                                               ⎪
                    <![CDATA[<condition> <gt> <property ref-id="PBom_quantity_GUID"/>
                    <constant>5</constant> </gt> </condition> ]]>             ⎬ 710c
                </condition_xml>                                              ⎪
                <ref_id>cond_1</ref_id>                                       ⎭
            </Item>
            <Item type="qry_QueryItem">                                       ⎫
                <alias>TopPart</alias>                                        ⎪
                <condition_ref_id/>                                           ⎬ 715a
                <item_type type="ItemType" name="Part"                        ⎪
                    keyed_name="Part">4F1AC04A28484F3A8A4E20D863808A88</item_type>
                <ref_id>part_1</ref_id>                                       ⎭
                <Relationships>
                    <Item type="qry_QueryItemSelectProperty">                 ⎫
                        <property_ref_id>TopPart_id_GUID</property_ref_id>    ⎬ 720a
                    </Item>                                                   ⎭
                    <Item type="qry_QueryItemSelectProperty">                 ⎫
                        <property_ref_id>TopPart_itemNumber_GUID</property_ref_id>  ⎬ 720b
                    </Item>                                                   ⎭
                    <Item type="qry_QueryItemSelectProperty">                 ⎫
                        <property_ref_id>TopPart_createdById_GUID</property_ref_id>  ⎬ 720c
                    </Item>                                                   ⎭
                    <Item type="qry_QueryItemSortProperty">                   ⎫
                        <property_ref_id>TopPart_name_GUID</property_ref_id>  ⎪
                        <sort_order>128</sort_order>                          ⎬ 725
                        <sort_order_direction>Ascending</sort_order_direction> ⎪
                    </Item>                                                   ⎭
                </Relationships>
```

FIG. 7B

```
                </Item>
              - <Item type="qry_QueryItem">
                    <alias>PBom</alias>
                    <condition_ref_id>cond_1</condition_ref_id>
715b            <item_type type="ItemType" name="Part BOM" keyed_name="Part
                    BOM">5E9C5A12CC58413A8670CF4003C57848</item_type>
                    <ref_id>part_bom_1</ref_id>
                + <Relationships>
                </Item>
              - <Item type="qry_QueryItem">
                    <alias>RelPart</alias>
715c              <condition_ref_id/>
                  <item_type type="ItemType" name="Part"
                       keyed_name="Part">4F1AC04A2B484F3ABA4E20DB63808A88</item_type>
                    <ref_id>part_2</ref_id>
                  - <Relationships>
                     - <Item type="qry_QueryItemSelectProperty">
720d                    <property_ref_id>RelPart_itemNumber_GUID</property_ref_id>
                       </Item>
                    </Relationships>
                </Item>
              - <Item type="qry_QueryReference">
                    <child_ref_id>part_bom_1</child_ref_id>
730a              <condition_ref_id>join_cond_1</condition_ref_id>
                    <parent_ref_id>part_1</parent_ref_id>
                    <ref_id>qref_1</ref_id>
                </Item>
              - <Item type="qry_QueryReference">
                    <child_ref_id>part_2</child_ref_id>
730b              <condition_ref_id>join_cond_2</condition_ref_id>
                    <parent_ref_id>part_bom_1</parent_ref_id>
                    <ref_id>qref_2</ref_id>
                </Item>
              </Relationships>
            </Item>
        </AML>
```

FIG. 9

```
<Item type="qry_QueryDefinition" action="qry_ExecuteSimplifiedQueryDefinition">
  <Parameters>
    <parameter name="@PartNumber" type="string" value="IN-00001" />      } 905
  </Parameters>
  <Relationships>                                                            907
    <Item type="Part" qb:alias="Part" qb:select="id, item_number">
      <qb:filter>
        <eq>
          <property qb:alias="Part.item_number" />
          <parameter name="@PartNumber" />                                    910
        </eq>
      </qb:filter>
    </Item>
  </Relationships>
</Item>
```

FIG. 10

```xml
<Item type="qry_QueryDefinition"
 action="qry_ExecuteSimplifiedQueryDefinition">
  <Parameters>
    <parameter name="@Levels" type="integer" value="2" />
  </Parameters>
  <Relationships>
    <Item type="Part" qb:alias="Part" qb:select="id, item_number">
      <Relationships>
        <Item type="Part BOM" qb:alias="Part BOM" qb:select="id">
          <qb:fetch>
            <if>
              <condition>
                <match-path>
                  <parameter name="@ExecutionPath" />
                  <format-string format="QR1/(QR2/QR1){#0}/">
                    <argument-value key="#0">
                      <parameter name="@Levels" />
                    </argument-value>
                  </format-string>
                </match-path>
              </condition>
              <then>0</then>
            </if>
          </qb:fetch>
        </Item>
      </Relationships>
    </Item>
  </Relationships>
</Item>
```

1000

1005 — Parameters block

1010 — Part BOM block

FIG. 12A ⎯1200

```xml
<?xml version="1.0"?>
<SOAP-ENV:Envelope xmlns:SOAP-ENV="http://schemas.xmlsoap.org/soap/envelope/">
  <SOAP-ENV:Body>
    <Result>
      <Item type="TopPart">                                                         ⎫
        <created_by_id keyed_name="Innovator Admin">30B991F927274FA3829655F50C99472E</created_by_id>   ⎬ 1205a
        <id keyed_name="part_1">5B5E6A6A639B4B0AAE95E0EE5E940A3B</id>
        <item_number>part_1</item_number>
      </Item>                                                                       ⎭
      <Item type="TopPart">                                                         ⎫
        <created_by_id keyed_name="Innovator Admin">30B991F927274FA3829655F50C99472E</created_by_id>
        <id keyed_name="part_2">F1C7326185D44130B12F33CC840975A5</id>
        <item_number>part_2</item_number>
        <Relationships>
          <Item type="PBom">
            <quantity>18</quantity>
            <related_id keyed_name="part_7">
          </Item>
          <Item type="PBom">
            <quantity>12</quantity>                                                 ⎬ 1205b
            <related_id keyed_name="part_3">
              <Item type="RelPart">
                <item_number>part_3</item_number>
              </Item>
            </related_id>
          </Item>
          <Item type="PBom">
            <quantity>7</quantity>
            <related_id keyed_name="part_4">
              <Item type="RelPart">
                <item_number>part_4</item_number>
              </Item>
            </related_id>
          </Item>
        </Relationships>
      </Item>                                                                       ⎭
      <Item type="TopPart">                                                         ⎫
        <created_by_id keyed_name="Innovator Admin">30B991F927274FA3829655F50C99472E</created_by_id>
        <id keyed_name="part_3">10886AD522F24A3987A834A22E0C7895</id>
        <item_number>part_3</item_number>
        <Relationships>
          <Item type="PBom">
            <quantity>11</quantity>                                                 ⎬ 1205c
            <related_id keyed_name="part_4">
              <Item type="RelPart">
                <item_number>part_4</item_number>
              </Item>
            </related_id>
          </Item>
        </Relationships>
      </Item>                                                                       ⎭
```

FIG. 12B

```
       ┌ <Item type="TopPart">
       │    <created_by_id keyed_name="Innovator Admin">308991F927374FA3829655F50C99472E</created_by_id>
1205d ─┤    <id keyed_name="part_5">84E0DD828849496D86F86F88A48E0F6D</id>
       │    <item_number>part_5</item_number>
       └ </Item>
       ┌ <Item type="TopPart">
       │    <created_by_id keyed_name="Innovator Admin">308991F927374FA3829655F50C99472E</created_by_id>
1205e ─┤    <id keyed_name="part_6">A8FD8D1983634E59A2E66CF1C1610E4D</id>
       │    <item_number>part_6</item_number>
       └ </Item>
       ┌ <Item type="TopPart">
       │    <created_by_id keyed_name="Innovator Admin">308991F927374FA3829655F50C99472E</created_by_id>
1205f ─┤    <id keyed_name="part_7">D68CFA6888424AFD98849DF996190D35</id>
       │    <item_number>part_7</item_number>
       └ </Item>
       ┌ <Item type="TopPart">
       │    <created_by_id keyed_name="Innovator Admin">308991F927374FA3829655F50C99472E</created_by_id>
1205g ─┤    <id keyed_name="part_8">654665D4E35143F1A372B4847706A656</id>
       │    <item_number>part_8</item_number>
       └ </Item>
         </Result>
         </SOAP-ENV:Body>
         </SOAP-ENV:Envelope>
```

```xml
<AML>
<Item alias="Part">
    <id>ROOT_PART_ID</id>
    <Relationships>
        <Item alias="Part BOM">
            <id>PB_1</id>
            <Relationships>
                <Item alias="Part">
                    <id>REUSED_PART_ID</id>
                </Item>
            </Relationships>
        </Item>
        <Item alias="Part BOM">
            <id>PB_2</id>
            <Relationships>
                <Item alias="Part">
                    <id>REUSED_PART_ID</id>
                </Item>
            </Relationships>
        </Item>
        <Item alias="Part BOM">
            <id>PB_3</id>
            <Relationships>
                <Item alias="Part">
                    <id>NON_REUSED_PART_ID</id>
                    <Relationships>
                        <Item alias="Part BOM">
                            <id>PB_4</id>
                            <Relationships>
                                <Item alias="Part">
                                    <id>REUSED_PART_ID</id>
                                    <Relationships>
                                        <Item alias="Part Document">
                                            <id>PD_1</id>
                                        </Item>
                                    </Relationships>
                                </Item>
                            </Relationships>
                        </Item>
                    </Relationships>
                </Item>
            </Relationships>
        </Item>
    </Relationships>
</Item>
</AML>
```

```
<Result>
    <Item alias="Part">
        <id>ROOT_PART_ID</id>
        <QB_flat_id>0</QB_flat_id>
        <QB_flat_parent_ids></QB_flat_parent_ids>
    </Item>
    <Item alias="Part BOM">
        <id>PB_1</id>
        <QB_flat_id>1</QB_flat_id>
        <QB_flat_parent_ids>0</QB_flat_parent_ids>
    </Item>
    <Item alias="Part BOM">
        <id>PB_2</id>
        <QB_flat_id>2</QB_flat_id>
        <QB_flat_parent_ids>0</QB_flat_parent_ids>
    </Item>
    <Item alias="Part BOM">
        <id>PB_3</id>
        <QB_flat_id>3</QB_flat_id>
        <QB_flat_parent_ids>0</QB_flat_parent_ids>
    </Item>
    <Item alias="Part">
        <id>REUSED_PART_ID</id>
        <QB_flat_id>4</QB_flat_id>
        <QB_flat_parent_ids>1,2</QB_flat_parent_ids>
    </Item>
    <Item alias="Part">
        <id>NON_REUSED_PART_ID</id>
        <QB_flat_id>5</QB_flat_id>
        <QB_flat_parent_ids>3</QB_flat_parent_ids>
    </Item>
    <Item alias="Part BOM">
        <id>PB_4</id>
        <QB_flat_id>6</QB_flat_id>
        <QB_flat_parent_ids>5</QB_flat_parent_ids>
    </Item>
    <Item alias="Part">
        <id>REUSED_PART_ID</id>
        <QB_flat_id>7</QB_flat_id>
        <QB_flat_parent_ids>6</QB_flat_parent_ids>
    </Item>
    <Item alias="Part Document">
        <id>PD_1</id>
        <QB_flat_id>8</QB_flat_id>
        <QB_flat_parent_ids>7</QB_flat_parent_ids>
    </Item>
</Result>
```

FEDERATED SERVICES ARCHITECTURE THAT ENABLES INTEGRATING EXTERNAL SYSTEMS INTO A SELF-DESCRIBING DATA MODEL

CROSS-REFERENCE TO OTHER APPLICATIONS

This application claims priority to and the benefit of U.S. Provisional Patent Application Ser. No. 63/209,185, filed Jun. 10, 2021, titled "Federated Services Architecture that Enables Integrating External Systems into a Self-Describing Data Model", the entire disclosure of which is hereby incorporated by reference for all purposes.

TECHNICAL FIELD

This disclosure relates generally to search technology. More specifically, this disclosure relates to a query engine for recursive searches in a self-describing data system.

BACKGROUND

The technical challenges associated with implementing a search, or query functionality on data expressed in certain markup languages and stored in a database, in particular, a relational database, such as a SQL server database include, without limitation, difficulty in formulating and executing recursive search queries as well as searching across a dynamic data model. Specifically, recursive searches of relational databases require iterative and repetitive reformulation of the search query. Further, certain markup languages do not support query functionality over across dynamic data models, as changes to the data model will block the execution of the search, typically resulting in an error message indicating that the database schema is different than an expected schema.

In addition, various computer-implemented systems (e.g., software applications implemented in computer code) use varying data formats that are based on schemas and tailored according to certain design principles. In certain situations, such as at an enterprise level, it may be desirable to integrate multiple computer-implemented systems in a manner that enables communicating data amongst the integrated computer-implemented systems. Such communication may enable combining data from different computer-implemented systems to make operation determinations and/or to present desired reports.

SUMMARY

This disclosure provides a query engine for recursive searches in a self-describing data system.

In one embodiment, a computing device includes a memory device storing instructions, and a processing device communicatively coupled to the memory device. The processing device executes the instructions to execute a computer-implemented system configured to manage items in a self-describing data model, and generate a representation of a federated system in the self-describing data model. The representation includes logical model items having logical model item types associated with data in an external object model used by a third-party computer-implemented system. The processing device may enable communication of the items and the logical model items between a client computer-implemented system and the third-party computer-implemented system.

In one embodiment, a computing device includes a computer-implemented system executed by the computing device, wherein the computer-implemented system is configured to generate a logical model item type in a self-describing data model implemented by the computer-implemented system. The logical model item type defines a schema of an external object model implemented by a third-party computer-implemented system executed by a third-party computing device, and the logical model item type comprises a logical model type (LMT) item type representing data of the third-party computer-implemented system. The computer-implemented system is configured to generate a mapping item type in the self-describing data model, wherein the mapping item type defines a mapping between an item type of the external object model and the LMT item type. The computer-implemented system is configured to receive, from a client computing device, a request for data pertaining to the LMT item type, generate, based on the mapping and connection information pertaining to the third-party computer-implemented system, a second request for the data, transmit, using the connection information, the second request to the third-party computer-implemented system, receive, from the third-party computer-implemented system, a response including the data, and transmit the data to the client computing device.

In some embodiments, computer-implemented methods stored as instructions in one or more memory devices may be executed by one or more processing devices to perform any of the operations disclosed herein.

In some embodiments, tangible, non-transitory computer-readable mediums storing instructions that, when executed, cause one or more processing devices to perform any of the operations disclosed herein.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates an example of a tag creating an instance of an item in a self-describing data system according to various embodiments of this disclosure;

FIGS. 7A and 7B illustrate an example of a configuration document setting forth the configuration of a query based on a self-describing data model according to certain embodiments of this disclosure;

FIG. 9 illustrates an example of a query configuration document comprising an instance of an item belonging to the query parameter item type which provides a user-defined filter on the query response data set;

FIG. 10 illustrates an embodiment of a query configuration document comprising an instance of an item belonging to the query parameter item type;

FIGS. 12A and 12B illustrate an example of a markup language document comprising query results obtained and outputted according to various embodiments of this disclosure;

FIGS. 14A and 14B illustrate query results outputted according to embodiments of this disclosure;

DETAILED DESCRIPTION

Figure 2:
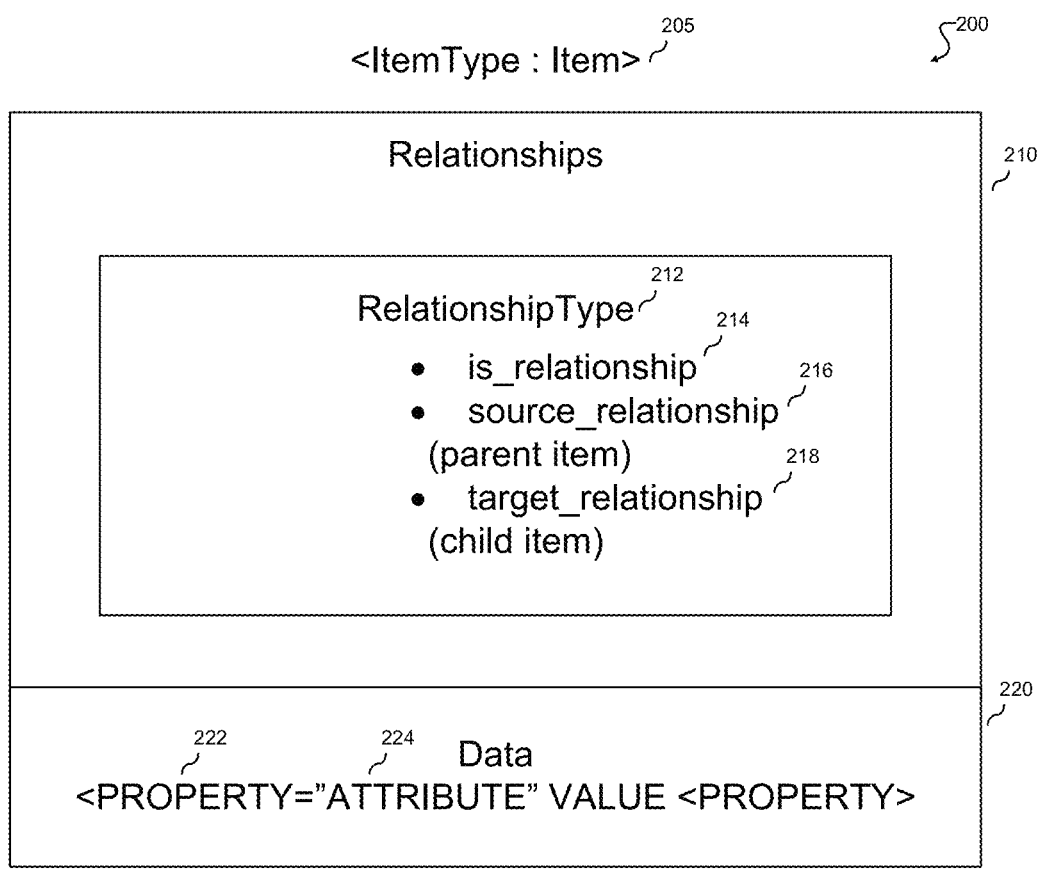
FIG. 2 illustrates, at a structural level aspects of the configuration of an item in a self-describing data system according to various embodiments of this disclosure.

FIGS. 1 through 16, discussed below, and the various embodiments used to describe the principles o this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates an example of an <item> tag 100 defining an instance of an item in a self-describing data system according to various embodiments of this disclosure.

According to certain embodiments, the foundational element of a self-describing data system is an item, instances of which may be maintained in persistent storage in a relational database. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

Further, in the non-limiting example of FIG. 1, <item> tag 100 defines an instance of an item, which is in turn, an instance of an ItemType, which is itself an item. In this way, the instance of an item defined by <item> tag 100 belongs to a self-describing data system. Further, in some embodiments each ItemType has a relational table in the database, whose columns map to the property names of the ItemType.

According to various embodiments, the instance of the item defined by <item> tag 100 comprises three principal attributes, a type 105, an ID 110 and an action 115. It should be noted that the following three attributes are not the only attributes which can be applied to an item.

In the non-limiting example shown in FIG. 1, type 105 comprises an ItemType name for the instance of the item defined by <item> tag 100. According to certain embodiments, type 105 expresses an ItemType name for the item defined by <item> tag 100. In the non-limiting example of FIG. 1, the name of the item type is the string "Part." According to various embodiments, the namespace for the "type" attribute is extensible and can be dynamically changed, as new names for ItemTypes become necessary. For example, in some embodiments, the item defined by <item> tag 100 may be a piece of data associated with a manufacturing process. In such cases, additional names for ItemTypes, such as "BOM" (Bill of Materials) may become necessary.

According to various embodiments, ID 110 comprises a unique identifier for the instance of an item created by <item> tag 100. In the non-limiting example of FIG. 1, ID 110 comprises the string "ABCDEF012345." According to certain embodiments, ID 110 provides, without limitation, a primary key for the instance of the item for the purposes of providing query results.

In some embodiments, action 115 comprises a method to be applied to the instance of an item defined by <item> tag 100. In the non-limiting example of FIG. 1, the method specified by action 115 is a "get." The instance of an item type defined by <item> tag 100 may, in some embodiments, include one or more Relationship tags, from which a query may be constructed. According to various embodiments, the methods specified by action 115 may be implemented by an API, for example, an API implementing the Aras Innovator Object Model or Item Object Model.

FIG. 2 illustrates, at a structural level, aspects of the configuration 200 of an item in a self-describing data system according to various embodiments of this disclosure.

Referring to the non-limiting example of FIG. 2, the item described by configuration 200 may be initially defined by an <item> tag 205, which according to various embodiments, embodies the syntax and three principal attributes of <item> tag 100 shown in FIG. 1.

According to certain embodiments, the configuration 200 of an item may be expressed as a markup language document (for example, an AML, document). In some embodiments, item 200's configuration may be expressed through an "/Item/Relationships/Item/Relationships" pattern in an AML document. Further, the document expressing the configuration 200 of the item may contain data 220 (which are themselves, items), structure or relationships 210 (which are hierarchical items) and logic, which, as shown in the example of FIG. 1, may be expressed through an action attribute (for example, action 115 shown in FIG. 1) of each item.

In the non-limiting example of FIG. 2, relationships 210 comprise hierarchical items. According to certain embodiments, an item's relationship to one or more other items may be expressed through a RelationshipType item 212. In some embodiments, wherein the document setting forth an item's configuration is written in AML, an instance of a RelationshipType item may be defined by using the <Relationships> tag, which is a container tag holding a set of relationship items.

As shown in FIG. 2, according to certain embodiments, the set of relationship items may comprise one or more of the following three properties, an is_relationship 214, a source_relationship 216 and a target_relationship 218.

In some embodiments, when the RelationshipType 212 is created, is_relationship 214 is also created. Is_relationship 214 comprises an item, and its id is the value of the relationship_id property of RelationshipType 212. As such, is_relationship 214 operates to provide an ItemType pairing to RelationshipType 212, and to define a RelationshipType rule and an ItemType for storing the source_relationship 216 and target_relationship 218 properties of the RelationshipType item 212.

According to certain embodiments, source_relationship 216 is a property of RelationshipType 212 which comprises a link pointing to a child item. Similarly, target_relationship 218 is a property of RelationshipType 212, which comprises a link to a child item.

As shown in the non-limiting example of FIG. 2, the configuration 200 of an item may further comprise data 220 expressed as values of properties, wherein the properties may further be specified by attributes.

According to certain embodiments, a property 222 defines data for an item. Examples of properties may include, for example, a cost for an item, which could be expressed in AML or XML in the form: "<cost>232.13</cost>" indicating that a particular item has a cost value of "232.13" units.

According to certain embodiments, items of data for an item may be further specified with an attribute 224, which may be analogized as metadata for the item or property, and controlling logic and methods associated with the item. For example, an attribute may define a conditional, producing an AML or XML expression of the form "<cost condition="between">10.00 and 50.00</cost>" In this example, the property "cost" is further specified through the "between" attribute for which the values 10.00 and 50.00 are specified.

According to certain embodiments, the configuration 200 for an item may further include history data for the item, showing some or all of the previous configurations of the item.

Figure 3:
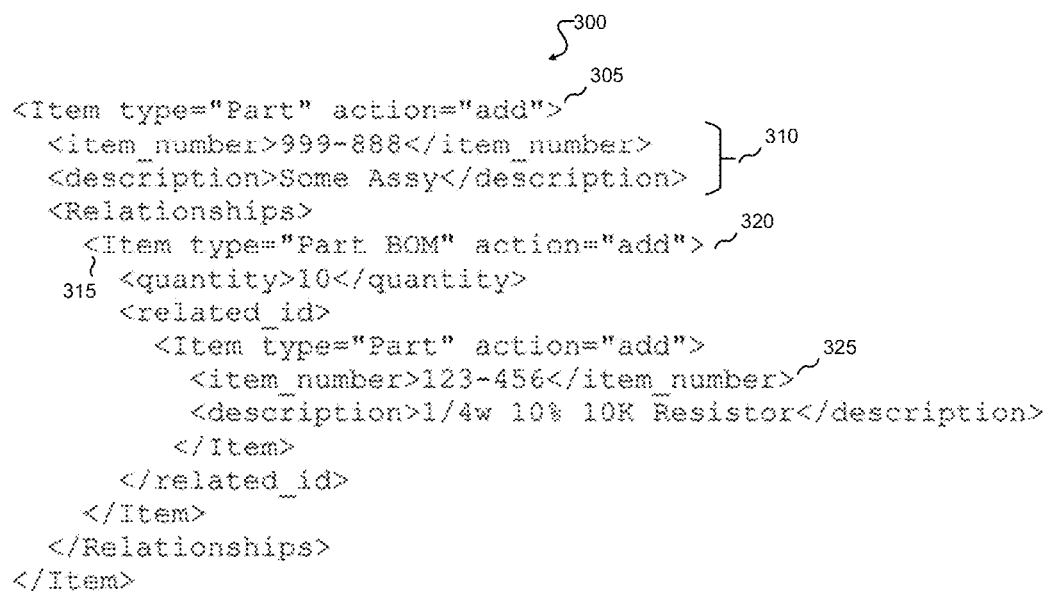
FIG. 3 illustrates an example of a configuration document for an item according to certain embodiments of this disclosure.

FIG. 3 illustrates an example of a configuration document 300 for an item according to certain embodiments of this disclosure. As shown in the non-limiting example of FIG. 3, an instance of an ItemType is declared through an initial <item> tag 305, which specifies that this instance of an item is of the "Part" type and is associated with an "add" method.

The properties 310 of the item are set forth, and include an "item_number" value (which, according to certain embodiments, may function as a unique identifier of the instance of the item) and a "description" value, which, in this case is "Some Assy" (an abbreviation of "some assembly.")

Container tag 315 specifies that the item has relationships, including a first relationship 320 with item indicating an "add" method with an item of the type "Part BOM." Item configuration 300 further specifies a "related_id" (e.g., child relationship between the "Part BOM" item and a child "part" item 325. Thus, by applying the "/Item/Relationships/Item/Relationships" pattern, a part-to-part BOM relationship may be described.

Figure 4:
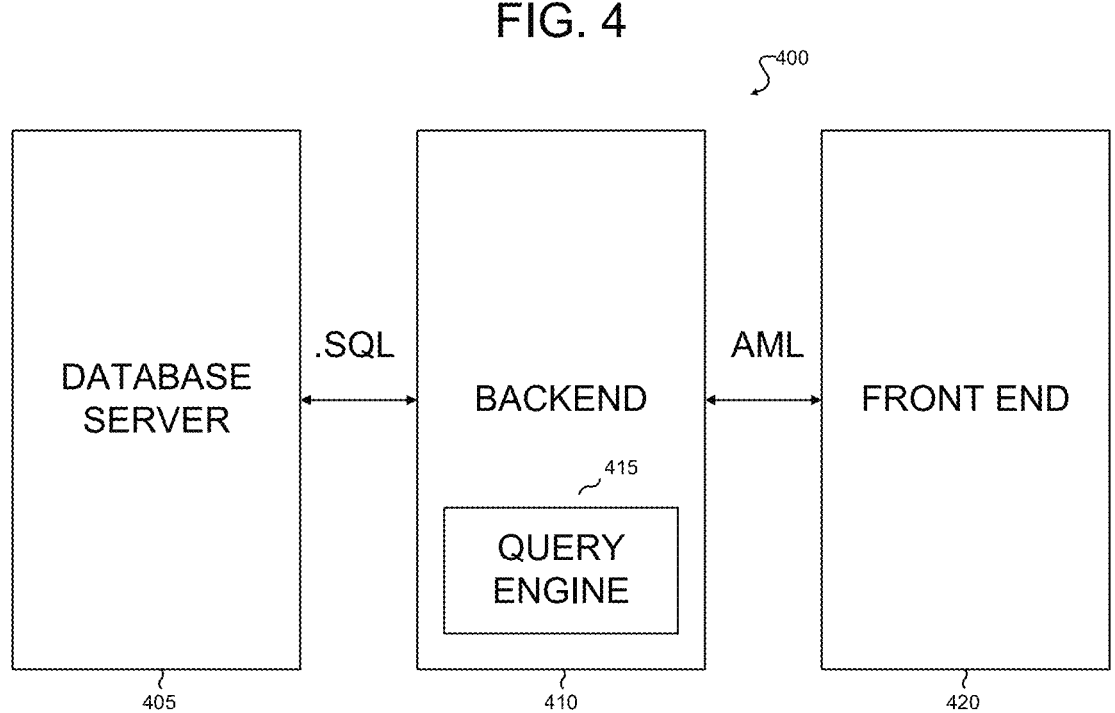
FIG. 4 illustrates an example of a system architecture for implementing a query engine for performing recursive searches in a self-describing data system according to various embodiments of this disclosure.

FIG. 4 illustrates an example of a system architecture 400 for implementing a query engine for performing recursive searches in a self-describing data system according to certain embodiments of this disclosure. In the non-limiting example of FIG. 4, network architecture comprises a database server 405, a backend server 410 implementing query engine 415, and a front end 420.

According to certain embodiments, database server 405 is a server hosting data and implementing one or more database applications supporting query functionalities. Database server 405 is generally platform-agnostic and may host data in a number of known database formats, including a relational database format (for example, by running an instance of .SQL server) or as a columnar database format. In the non-limiting example of FIG. 4, database server 405 is communicatively connected to backend 410. In some embodiments, this connection is provided over a network link, and in some other embodiments, backend 410 and database server 405 may be embodied on the same piece of hardware. Skilled artisans will appreciate that embodiments according to this disclosure may be implemented on a variety of hardware platforms.

According to certain embodiments, database server 405 is configured to receive queries expressed as statements in a domain-specific language (for example, structured query language), and return results from the database hosted on database server 405.

According to certain embodiments, backend 410 comprises a server or other computer configured to implement a query engine 415 configured to receive, from front end 420 query requests expressed in the syntax of a self-describing data system (for example, AML). As noted elsewhere, embodiments according to this disclosure are platform-agnostic and may be practiced across a wide range of hardware configurations and development environments. In some embodiments, query engine 415 may be implemented as an ASP.NET web service.

In the non-limiting example of FIG. 4, front end 420 is communicatively connected (for example, via a network or being embodied on the same piece of hardware) to backend 410. According to certain embodiments, front end 420 comprises a web client of a web service provided by backend 410, and provides a user interface (UI) through which queries can be input and query outputs displayed as a user. In certain embodiments, front end 420 may be constructed using modules from the HTML 5 DOJO toolkit. According to certain further embodiments, front end 420 may provide an interface through which users can configure parameters of queries and set permissions for queries.

Figure 5:
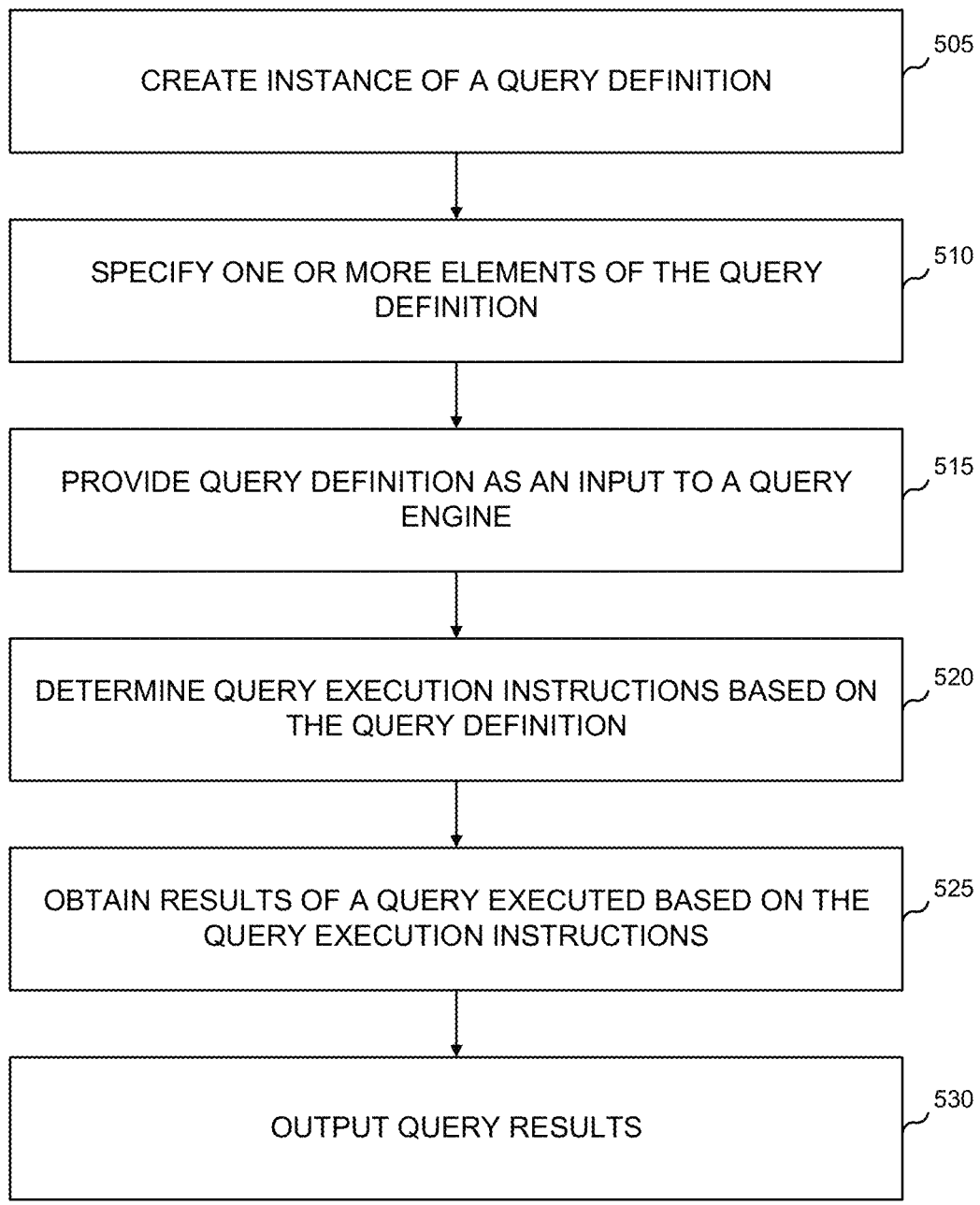
FIG. 5 illustrates operations of a query engine in one embodiment of a method for performing recursive searches in a self-describing data system.

FIG. 5 illustrates operations of a query engine in an example of a method 500 for performing recursive searches in a self-describing data system according to embodiments of this disclosure.

According to the non-limiting example of FIG. 5, method 500 includes operation 505, wherein the query engine creates an instance of a query definition. As discussed elsewhere in this disclosure, certain embodiments according to this disclosure utilize a self-describing data system, wherein the fundamental element of the data system is the item, which is an instance of an ItemType, which is, in turn, itself an item. Further, in certain self-describing data systems according to this disclosure, the configuration of items may be expressed through an "/Item/Relationships/Item/Relationships" pattern.

In some embodiments, a query definition is an item, and creating an instance of a query definition at operation 505 comprises beginning a markup language document (for example, an AML document) defining the configuration of the query definition. Further, a query definition may define the set of data (otherwise known as a domain) which a user is interested in seeing, and which can be collected across one or more different items types and/or relationships using user specified rules for filtering. Because a query definition defines the domain of a query, it may also be utilized to implement domain-based access controls to data items within the data structure.

According to certain embodiments, the AML document defining the configuration of the query begins with an instance of an <item> tag, an example of which is provided below:

<Item action="qry_Execute QueryDefinition" type="qry_QueryDefinition">

As shown above, according to some embodiments, an <item> tag creating an instance of a query definition specifies, at a minimum, a type of the instance of the query, which in this case, is a query definition (specified as "qry_QueryDefinition"), and a method, or action associated with the item, which in this case, is an instruction to execute a query, (specified as "qry_Execute Query Definition"). In some embodiments, the <item> tag creating the instance of the query definition item may further comprise a unique ID for the item, which in certain embodiments, may be advantageous if queries or query histories are stored in the data structure.

As shown in the non-limiting example of FIG. 5, method 500 includes operation 510, wherein the query builder, in response to a user input, specifies one or more elements of the query definition. According to certain embodiments, the one or more specified elements of the query definition may be specified as relationships, properties or attributes within the document providing the configuration of the query definition. Specifically, the one or more elements may be specified through additional items defining relationships or properties, including, without limitation, query items, query item selection properties, query item sort properties, query item available properties, query condition items and query reference items.

According to certain embodiments, method 500 includes operation 515, wherein the query definition is provided to a query engine. According to some embodiments, operations 505 and/or 510 may variously be performed at a front end client (for example, front end 420 shown in FIG. 4). According to other embodiments, operations 505 and/or 510 may be performed at the back end or programmatically at the query engine itself. According to certain embodiments, the query engine (for example, query engine 415 in FIG. 4) facilitates translating commands from a front end into query definitions, which are then converted into execution instructions to be passed to a database server (for example, database server 405 in FIG. 4). The query engine may further facilitate the construction of query definitions, and the provision of query results from the database server to the front end.

In some embodiments, method 500 also includes operation 520, wherein the query engine determines query execution instructions based on the received query definition. In the non-limiting example of FIG. 5, operation 520 comprises reading the query definition and translating it into a series of statements in the native language of the database server (for example, .SQL) and properly handling parameters defined within the query definition. As will be discussed further in this disclosure, as part of operation 520, the query engine may further specify an execution path for the query, as well as, where appropriate, recursion depths for recursive queries. In certain embodiments, the query execution instructions based on the query definition specify a recursive, level-by-level search of the data.

Additionally, in the non-limiting example of FIG. 5, the query execution instructions determined at operation 520 may be required to satisfy certain operational constraints, including without limitation, the ability to query a recursive structure, wherein a top level item is filtered by condition, while items from other levels are not filtered. Further, according to certain embodiments, querying a recursive structure must be performed without adding a "pseudo" top level item. Additionally, in certain embodiments, the execution instructions must enable a query of a recursive structure, wherein some intermediate level is filtered by a condition. Additionally, in some still further embodiments, the query execution instructions must enable limiting the depth of the retrieved structure, without modification of a recursive query topology.

According to various embodiments, at operation 525, the query engine obtains the results of a query executed based on the query execution instructions. According to certain embodiments, the results obtained at operation 525 may comprise generally unformatted data, and the query engine may assemble a response containing the results of the query.

In some embodiments, at operation 530, the query engine outputs the assembled query results. According to certain embodiments, operation 530 comprises returning the query response back to a user or application from which the request for a query was received (for example, front end 420 in FIG. 4). According to certain embodiments, the query results output at operation 530 may comprise a markup language document (for example, a document in XML, AML or some other extensible markup language dialect). According to other embodiments, at operation 530, the query engine may output query results as a flat output, a tree graph view or a graph visualization.

Figure 6:
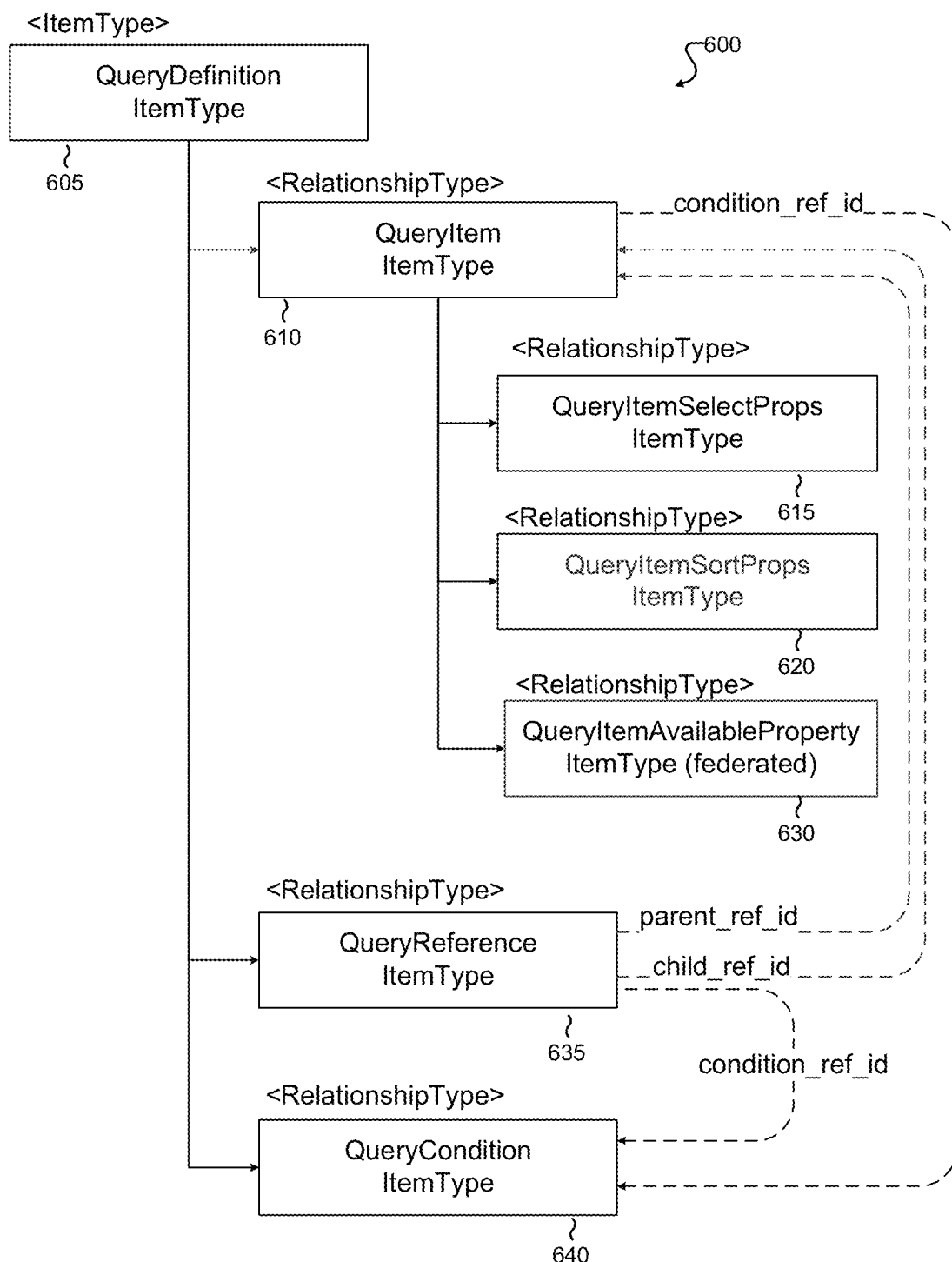
FIG. 6 illustrates, at a structural level, one example of a data model supporting a query definition item according to embodiments of this disclosure.

FIG. 6 illustrates, at a structural level, one example of a data model 600 supporting a query definition item according to embodiments of this disclosure. Note that, in this particular example, data model 600 comprises a hierarchical, tree like structure.

As shown in the non-limiting example of FIG. 6, data model 600 includes a query definition item 605, which occupies the top, or root level of the specified elements used to define a query. According to certain embodiments, query definition item 605 is an item of the "Query Definition" item type. Query Definition item 605 defines the set of data a user is interested in seeing. The data belonging to this set can be collected across one or more different Item Types using rules for filtering. Additionally, access controls can be implemented by defining additional filters excluding certain users from accessing (by including within the set of data encompassed by the user's query) data. According to certain embodiments, the properties of query definition item comprise a name, which can be a string specifying a unique name for the query definition. Additionally, the properties of query definition 605 can include a description, which can be a string or text describing the type of data represented by the query definition. Still further, the properties of the query definition can include a root query item id, which comprises a string representing the context item (also referred to as a root of the tree structure of data model 600) for query definition data model 600. According to other embodiments, properties of the query definition may include, without limitation, permissions.

According to certain embodiments, data model 600 is a self-describing data model which follows an "/Item/Relationship/Item/Relationship" description structure. Accordingly, in data model 600, a federated set of relationship properties 610 through 640 follow query definition 605. These relationships include query item 610. According to certain embodiments, query item 610 may appear as one or more <item> tags within a <relationship> container, such as shown in the example given in FIG. 3. Query item 610 is an item representing the source for properties, including properties to be selected and returned as part of the query response, and joins and filtering to be used, in the query definition. According to certain embodiments, the properties included in query item 610 include, without limitation, those set forth in Table 1 below:

TABLE 1

| Name | Label | Type | Description |
|---|---|---|---|
| classification | Classification | | Aggregation (GroupBy, SUM, AVG) Union Intersection Special Join |
| itemtype | ItemType | Item | ItemType which is described by Query Item (Item or Relationship) |
| Alias | Alias | String | Alias of Query Item which will be used in joins and conditions. |
| condition_ref_id | Referenced Condition | String | Referenced Query Condition. |
| ref_id | Reference ID | String | Reference ID of Query Item |

As shown in the non-limiting example of FIG. 5, query item 610 may have source and target relationships (such as described with respect to relationships 210 in FIG. 2) with other relationships within data model 600. For example, query item 610 may have both a parent and a child relationship with a query reference 635. Similarly, query item 610 may also be indicated as either the source or the target of a relationship with query condition 640.

According to certain embodiments, the relationships specified by data model 600 comprise query item selection properties 615, which define or identify which properties from query item 610 to include in the query response. An overview of the properties in one example of query item selection properties 615 is set forth in Table 2, below:

TABLE 2

| Name | Label | Type | Description |
| --- | --- | --- | --- |
| property_ref_id | Property | String | Reference to qry_QueryItemAvailableProperty via ref_id value. |

In some embodiments, the relationships specified by data model comprise query item sort properties 620, which define which properties from the associated query item are to be used for sorting data returned by the query, and how the sort is to be performed. An overview of properties of query item sort properties 620 is set forth in Table 3, below:

TABLE 3

| Name | Label | Type | Description |
| --- | --- | --- | --- |
| property_ref_id | Property | String | Reference to qry_QueryItemAvailableProperty via ref_id value. |
| sort_order | Sort Order | Integer | Order of sorting |
| sort_order_direction | Sort Order Direction | List | Values: Ascending, Descending |

According to various embodiments, the relationships specified by data model 600 further comprise query item available properties 630. In the non-limiting example of FIG. 6, query item available properties 630 define which federated properties from the associated query item to include in the query response. An overview of properties of query item available properties 630 is set forth in Table 4, below:

TABLE 4

| Name | Label | Type | Description |
| --- | --- | --- | --- |
| source_id | | Item (qry_QueryItem) | Reference to qry_QueryItem |
| name | Name | String | |
| label | Label | MLString | |
| type | Type | List | Data Type of the QueryItem property |
| ref_id | Reference ID | String | Reference ID (GUID) |

In the non-limiting example of FIG. 6, the relationships specified data model 600 further comprise query reference 635, which, like the other relationships shown in FIG. 6, may be expressed as an instance of an item within the <relationship> container tag. According to certain embodiments, query reference 635 defines join requirements between query items within the query definition, and as such, implements controls over how data is collected and aggregated across query items within the query definition which have relationships with one another. As shown in TABLE 5, below, in some embodiments, query reference 635 operates to specify relationships between query items in an analogous manner as relationships 212 in FIG. 2. An overview of properties of query reference 635 is set forth in Table 6, below:

TABLE 6

| Name | Label | Type | Description |
| --- | --- | --- | --- |
| parent_ref_id | Parent Item | String | Referenced parent Query Item. |
| child_ref_id | Child Item | String | Referenced child Query Item. |

TABLE 6-continued

| Name | Label | Type | Description |
| --- | --- | --- | --- |
| condition_ref_id | Referenced Condition | String | Referenced Query Condition. |

According to certain embodiments, the relationships specified within query definition data model 600 comprise query condition 640. Query condition 640 is an instance of an item which defines the filter conditions for the data request. According to certain embodiments, the scope of query condition 640 is the entity on which it is referenced, and a query condition can be optionally associated with a query item and query reference items. In the case where query condition 640 is referenced by a query item (for example, query item 610), then query condition filters the items defined by the query item. If, however, the query condition is referenced by a query reference (for example, query reference 635), it operates to filter the items defined by a query item referenced as the child query item for the query reference. An overview of properties of query condition 640 is set forth in Table 7 below:

TABLE 7

| Name | Label | Type | Description |
| --- | --- | --- | --- |
| condition_xml | Condition Xml | Text | Xml representation of specified conditions. |
| ref_id | Reference ID | String | Reference ID of Query Condition. |

FIGS. 7A and 7B illustrate an example of a markup language configuration document 700 setting forth the configuration of a query constructed based on a self-describing data model (for example, data model 600 in FIG. 6) according to embodiments of this disclosure.

As shown in the non-limiting example of FIGS. 7A and 7B, configuration document 700 includes an <item> tag 705 creating an instance of the query definition, whose properties include the action or method "qry_ExecuteQueryDefinition."

Referring to the non-limiting example of FIGS. 7A and 7B, configuration document 700 further includes three query condition items 710a, 710b and 710c specifying filters to be applied in the query. In this particular example, the properties of each of query condition items 710a through 710c are further specified by attributes further controlling the execution logic of the query. For example, in query condition item 710, the <condition> attribute is used to define the filter, as shown by the statement "<![CDATA[<condition> <eq> <property ref-id="TopPart_id_GUID"/><property ref-id="PBom_source_Id_GUID"/> </eq></condition>]]>".

Configuration document 700 further includes query items 715a, 715b and 715c which, set forth properties to be part of the query response, and the properties to be used in joins and filtering. For example, query item 715a specifies an item, having the name "part" and the attribute "keyed_name," with the value "4F1AC04A2B484F3ABA4E20DB63-808A88" as a filter for items to be returned by the query.

In the non-limiting example of FIGS. 7A and 7B, query document 700 further comprises query item selection properties 720a, 720b, 720c and 720d, which variously specify properties from query items 715a and 715c to include in the query response. For example, query item selection property 720a specifies the property "TopPart id" as a property to be returned with query response items satisfying the filter criterion "keyed_name"="4F1AC04A2B484F3ABA4E20-DB63808A88" specified by query item 715a.

Additionally, in this illustrative example, query document 700 further comprises an instance 725 of a query item sort property. In the non-limiting example of FIGS. 7A and 7B, instance 725 of a query item sort property specifies "TopPart_name" as the property to sort the items in the query response, and instance 725 of query item sort property includes the attribute "sort_order_direction" whose value "Ascending" indicates that the query response items are to be sorted by "TopPart_name" in ascending order.

As shown in the non-limiting example of FIGS. 7A and 7B, query document 700 further includes query reference items 730a and 730b, which specify how, in executing the query, data is collected and aggregated across query items which have relationships with other query items within the query definition. In this particular example, query reference items 730a and 730b specify join requirements, as shown, for example, by the property "<condition_ref_id>join_cond_1</condition_ref_id>" in query reference item 730a.

Figure 8:
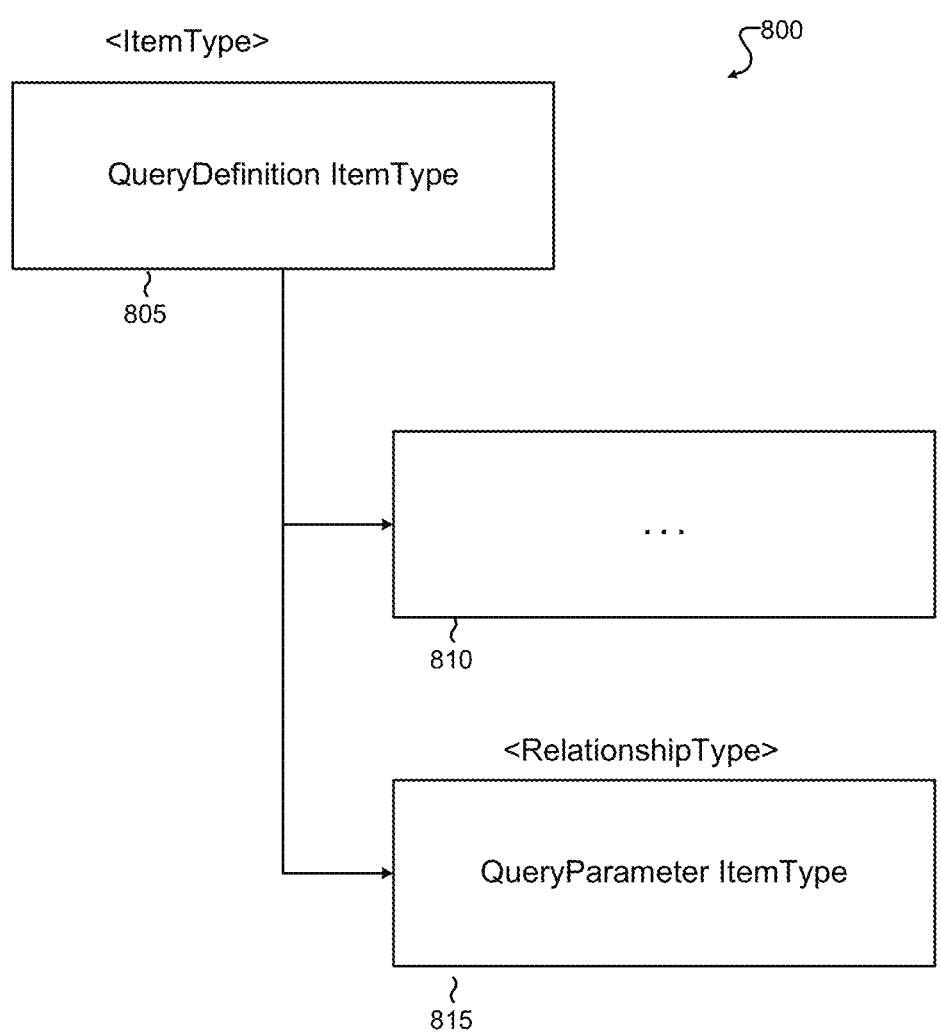
FIG. 8 at a structural level, an exemplary embodiment of an extension of a data model 800 for configuring recursive searches of a self-describing data system.

FIG. 8 illustrates, at a structural level, an exemplary embodiment of an extension of a data model 800 for configuring recursive searches of a self-describing data system.

In the non-limiting example of FIG. 8, data model 800 is represented as having a hierarchical tree structure, with query definition item 805 as the root, or context item type. Further, according to certain embodiments, data model 800 represents a query in a self-describing data system, whose elements follow a regular "/Item/Relationship/Item/Relationship" pattern.

Data model 800 may, according to various embodiments, include a variety of types of items 810 specifying relationships within the query definition. These items may comprise, for example, items 610-640 in FIG. 6, or a subset or superset thereof. Additionally, according to certain embodiments, data model 800 may further comprise items 815 belonging to the query parameter item type. According to various embodiments, query parameters comprise a user-defined parameter within query conditions which can be supplied at query execution time to override default values. Additionally, query parameters may also be used in other assignable values within a query definition, such as in offset and fetch values. The values for the parameters specified within the query parameter item may then be assigned at the time the query definition is to be executed.

Additionally, items 815 belonging to the query parameter item type may also be utilized to track or control aspects of the execution of a query. For example, according to certain embodiments, a user designed parameter "@ExecutionPath" is a dynamic parameter which may be calculated while processing a query definition to determine the progress of a query. Additionally, according to certain embodiments, items 815 belonging to the query parameter item type may also be used to define a query execution path, reflecting a route from a parent query item to a child query item in a query definition. Still further, items 815 belonging to the query parameter item type may be used to control the depth (i.e., how many levels are traversed) of recursion of a recursive query. According to some embodiments, a query engine (for example, query engine 415 in FIG. 4) will, by default and in the absence of a query parameter item specifying otherwise, exhaustively traverse all recursive paths.

FIG. 9 illustrates an embodiment of a query configuration document 900 comprising an instance of an item 905 belonging to the query parameter item type which provides a user-defined filter on the query response data set. As shown in the non-limiting example of FIG. 9, the container tag 907 "<Parameters>" signals the creation of the user-defined parameter having the name "@PartNumber," and the value "IN-0001." Further, as shown in FIG. 9, the parameter "@PartNumber" is specified as a filtering property 910 of a query response data set.

FIG. 10 illustrates an embodiment of a query configuration document 1000 comprising an instance 1005 of items belonging to the query parameter item type, by which the execution path of the query, in particular, the query recursion depth, may be controlled by defining a condition dependent on a value of the query parameter item. As shown in the non-limiting example of FIG. 10, an instance 1005 of the query parameter item defines the parameter named "@Levels," as being of an integer type. Once defined, the "@Level" parameter, in conjunction with the "@ExecutionPath" parameter is used as a value in conditional 1010, which determines the depth of the recursive query defined by query configuration document 1000.

Figure 11:
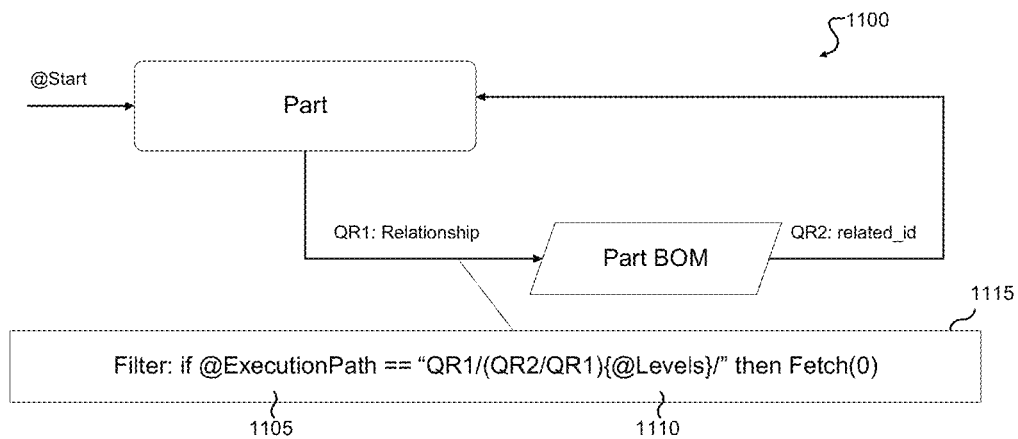
FIG. 11 illustrates, in wireframe format, an example of a query execution path for a query performed according to embodiments of this disclosure.

FIG. 11 illustrates, in wireframe format, a query execution path 1100 of a query (for example, the query described by query configuration document 1000 in FIG. 10). In the non-limiting example of FIG. 11, two items of the query parameter type are used to control query execution path. In this particular example, the first item 1105 of the query parameter type is the dynamic parameter "@ExecutionPath," and the second item 1110 of the query parameter type is the parameter "@Levels."

According to various embodiments, "@ExecutionPath" is a parameter calculated by a query execution engine (which according to certain embodiments, may be embodied as part of a query engine, such as, for example, query engine 415 in FIG. 4) tracking where the query execution engine is during the execution of a query definition. According to certain embodiments, query parameter "@ExecutionPath" is an item in a self-describing data system of the type "Path." In this particular example, the value of query parameter "@ExecutionPath" is a string reflecting a route from a parent query item (for example, query item 610 in FIG. 6) to a child query item via one or more query references (for example, query reference item 730a in FIG. 7).

In some embodiments, the query parameter "@Levels" is a parameter specifying the number of levels to "drill down" in a recursive search. Thus, in the example of FIG. 11, the execution path of the query, specifically, the items which are fetched while executing the query, is defined by the filter 1115 "if @ ExecutionPath=="QR1/(QR2/QR1){@Levels/}/" then Fetch(0)." In this non-limiting example, if the value of the parameter "@Levels" is zero, then the query pulls no items, because /QR1(/(QR2/QR1){0}/ is equal to "/QR1/" limiting the path of the "Part" query to "Part BOM." If "@Levels"=1, then the query "drills down" one level and fetches the root "Part." If "@Levels"=2, then the query "drills down" two levels, fetching the root "Part" and its children. Similarly, if "@Levels"=3, then the query "drills down" three levels within the hierarchy of the data structure, fetching the root "Part", its children and their children.

After an execution engine implements execution instructions based on the query definition, query engines according to certain embodiments of this disclosure obtain the results of the executed query and output the query results.

FIGS. 12A and 12B illustrate an example of a markup language document 1200 comprising query results obtained and outputted in a structured format. Specifically, markup language document 1200 comprises AML format results of the recursive query configured by query configuration document 700 shown in FIGS. 7A and 7B of this disclosure. According to certain embodiments, a query response, such as provided by document 1200 comprises the results of a query executed according to a query definition.

As shown in the non-limiting example of FIGS. 12A and 12B, query results 1200 mirror the "/Item/Relationship/Item/Relationship" structural pattern of the query definition and other documents constructed according to a self-describing data model. As shown in FIGS. 12A and 12B, the query returned results 1205a through 1205g, which, as specified by query item selection property 720c in FIG. 7 belong to the item type "Top Part." Further, as discussed elsewhere in this disclosure, in the absence of a query parameter item overriding a default recursion depth, the query was executed until a terminal node for each item in the query definition was reached, as shown by, for example, result 1205b.

According to certain embodiments, a query engine may output query results in a structured format, such as the structured format of the query definition (for example, as shown in FIGS. 12A and 12B) of this disclosure. According to certain other embodiments, the query engine may output results according to a different structural format, such as a graph visualization.

Figure 13:
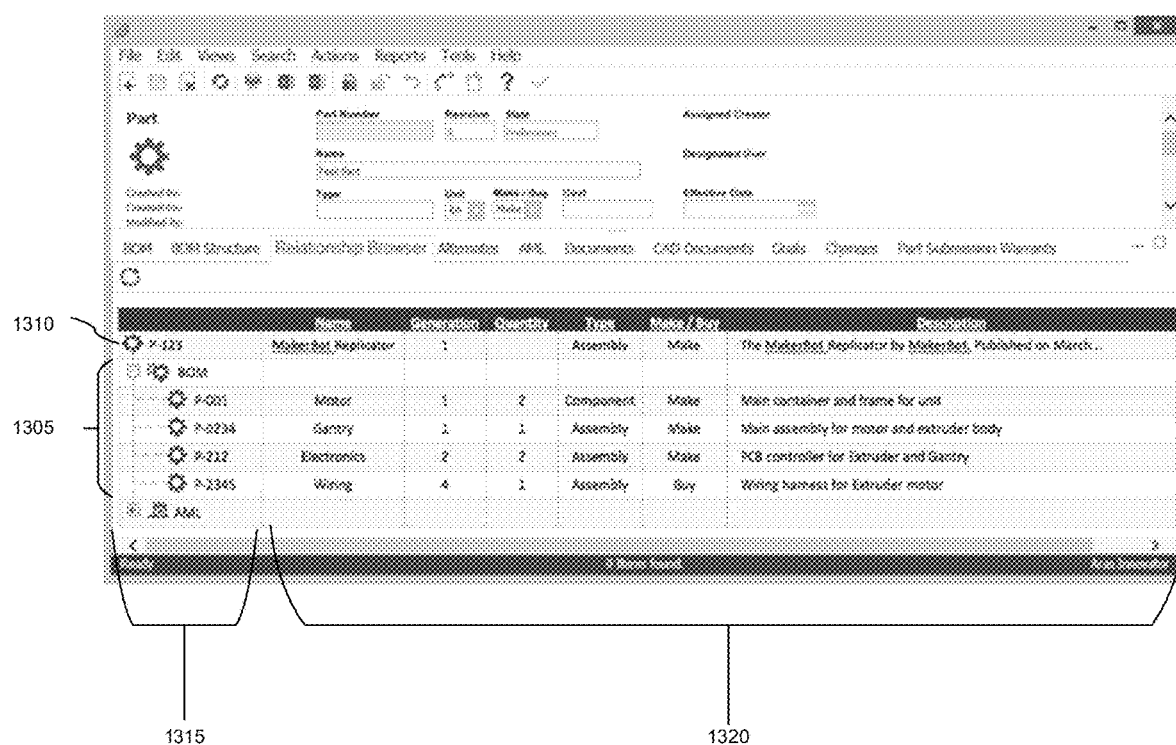
FIG. 13 illustrates of query results output in a tree grid format according to various embodiments of this disclosure.

As shown by FIG. 13, a query engine according to certain embodiments of this disclosure may output query results in a tree grid format. In the non-limiting example of FIG. 13, a view 1300 of a user interface (such as presented by front end 420 in FIG. 4) showing query results 1305 in a tree grid view. According to embodiments, the tree grid view enables the query results to be displayed in a way that reflects the structure of the query definition by which they were obtained. As such, according to certain embodiments, query result items are displayed in a hierarchical manner reflecting their relationship to a context item, or root node, and which displays the relationship between items obtained by the executed query. In this particular example, query results 1305 are shown according to their relationship to context item, or root node "P-123," which in this example, corresponds to a "MakerBot Replicator." According to certain embodiments, the leftmost column 1315 of the tree grid view indicates hierarchical (i.e., parent-child relationship between the displayed items), while the columns to the right 1320 indicate properties of the items returned by the executed query.

According to certain embodiments or under certain conditions (for example, when performing very, very large queries, such as queries of a bill of materials for a helicopter, which when expressed as items in a self-describing data structure, may comprise a data structure with ~30,000,000 item nodes) the performance of the query engine may be improved by outputting the query results in a "flat" or unstructured format. In contrast to certain structured output formats according to embodiments of this disclosure, wherein the query results are outputted in a manner that reflects and allows reconstruction of, the hierarchy and relationships within the query structure and query execution path, a "flat" output may adhere to a simplified structure, wherein only "key properties" are displayed. In this way, the file size of the query result may be made more manageable.

FIG. 14A illustrates an example of a query result set 1400 of an executed query which has been output in a structured format, in this case AML. In this non-limiting example, a significant portion of the output 1405 is dedicated to </Relationship> container tags for expressing the hierarchy of relationships between items in the result set.

FIG. 14B illustrates an example of a query result set 1410 for the same query as in FIG. 14A, which has been output in a flat format with "id" defined as a key property of the output. Skilled artisans will appreciate that result set 1405 may be more readily processed than result set 1400 in the absence of an extended hierarchy defined by multiple </Relationship>container tags 1405. Further, according to certain embodiments, query result set 1400 may be readily converted into a structured result by calling the "qry_ConvertFlatToStructuredResult" method of the Aras IOM API.

The functionality and performance of query engines according to embodiments of this disclosure may be further enhanced by through the use of extended classification items. Extending the data model of a self-describing data system through the use of extended classifications may enhance the ability of the query engine to perform queries of polyhierarchical relationships, equivalence and associative relationships. Further, extended classifications according to embodiments of this disclosure may enhance the operation of a query engine, by enabling users to add additional properties to an item, without changing the underlying item type of the item. In this way, searches across the additional properties may be conducted quickly, in that the result set will not necessarily include null classes for the item instances not having the newly added (or extended) properties.

According to certain embodiments, an extended classification encompasses a kind of item, defining a collection of properties, which are specific to an object classified by a term. Further, in some embodiments, an extended property comprises a property which exists on a global scope and which is not specific to any one item type. According to certain embodiments, extended properties may be defined via one or more extended classifications.

Figure 15:
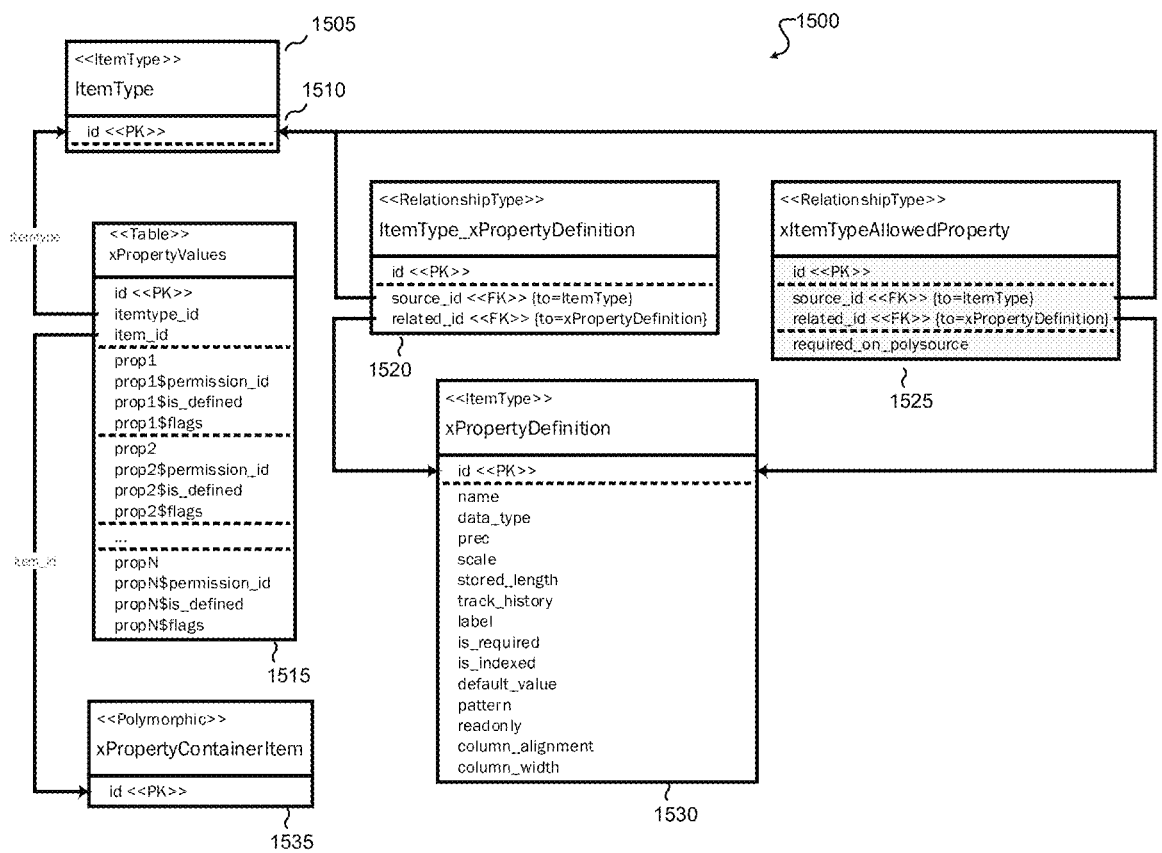
FIG. 15 illustrates a data model for implementing extended properties in a self-describing data system according to various embodiments of this disclosure.

FIG. 15 illustrates a data model 1500 for implementing extended properties in a self-describing data system according to various embodiments of this disclosure.

As shown in the non-limiting example of FIG. 15, data model 1500 is hierarchical and anchored, or rooted to an instance of an item type 1505, whose properties include an "id" value 1510 which operates as a primary key specifying relationships between instance of an item type 1505 and extended property items 1515-1535.

According to various embodiments, data model 1500 describes a self-describing system whose items follow an "/Item/Relationship/Item/Relationship" structural pattern. Further, data model 1500 comprises xPropertyDefinition ItemType 1530, which defines a property which is defined on a global scope and is not specific to any one item type. As shown in FIG. 15, xPropertyDefinition ItemType 1530 is a child of ItemType xPropertyDefinition Relationship Type 1520. A list of properties supported by xProperty Definition ItemType 1530 is shown in TABLE 8 below:

TABLE 8

| Property Name | Label | Data Type |
| --- | --- | --- |
| name | Name | string (32) |
| label | Label | ml_string |
| data_type | Data Type | list (Data Types) |
| data_source | Data Source | Item (ItemType) |
| stored_length | Length | integer |
| prec | Precision | integer |
| scale | Scale | integer |
| is_required | Required | boolean |
| is_indexed | Indexed | boolean |
| column_alignment | Alignment | list (Text Alignment) |
| column_width | Width | integer |
| default_value | Default Value | ml_string |
| pattern | Pattern | string (512) |
| readonly | Read Only | boolean |
| help_tooltip | Tooltip | ml_string |
| track_history | Track History | boolean |

According to certain embodiments, data model 1500 further comprises ItemType_xPropertyDefinition Relationship Type 1520, which describes a link between a particular ItemType and an xPropertyDefinition ItemType 1530. According to various embodiments, any xProperty Definition can be assigned to multiple ItemTypes and any ItemType may have multiple assigned XProperty definitions.

As shown in the non-limiting example of FIG. 15, data model 1500 may further comprise xItemTypeAllowedProperty Relationship Type 1525. According to certain embodiments, xItemTypeAllowedProperty Relationship Type 1525 describes a link between a particular ItemType and an xPropertyDefinition, which contains all allowed xProperties for the ItemType. As used in this disclosure, an allowed xProperty refers to an xProperty assigned to a particular ItemType, and which is the only xProperty which can be defined on Items of that particular ItemType.

According to certain embodiments, data model 1500 comprises xPropertyContainerItem 1535, which describes an ItemType which has at least one allowed xPropertyDefinition. When an xPropertyDefinition is assigned to this ItemType, this ItemType will be added to a list of polymorphic sources of xPropertyContainerItem 1535.

In some embodiments according to this disclosure, data model comprises a table of xPropertyValues 1515. As noted elsewhere in this disclosure, the implementation of extended classifications and extended properties enables properties to be dynamically added or removed from an instance of an ItemType without changing the type of the item. According to some embodiments, this may be accomplished by maintaining the values of the extended properties in a separate table from the items to which they relate.

Figure 16:
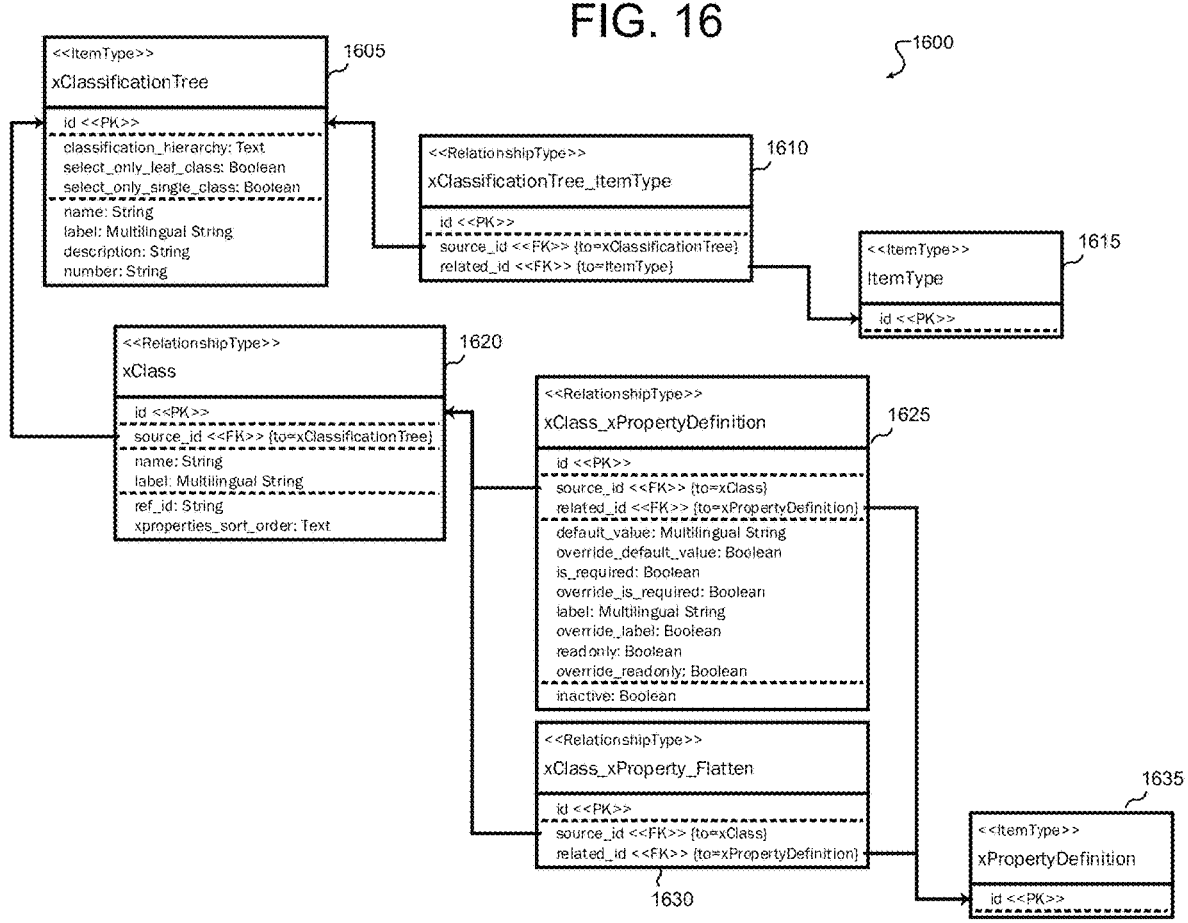
FIG. 16 illustrates an example of a data model for implementing extended classification according to embodiments of this disclosure.

As discussed elsewhere in this disclosure, an extended classification is a type of item which defines a collection of properties, which may be specific to an object classified by a term. FIG. 16 illustrates an example of a data model 1600 for implementing extended classification in a self-describing data system according to embodiments of this disclosure.

In the non-limiting example of FIG. 16, data model 1600 comprises, as its context item, or root, an instance of xClassificationTree ItemType 1605. According to embodiments, xClassificationTree ItemType 1605 defines a taxonomy, which is a collection of terms (also referred to as "xClasses," organized into a hierarchical structure. xClassificationTree ItemType 1605, is, according to certain embodiments, a self-contained unit which contains xClasses which are specific to only that tree. The properties of xClassficationTree ItemType 1605, according to certain embodiments are shown in Table 9, below:

TABLE 9

| Property Name | Label | Data Type |
| --- | --- | --- |
| name | Name | string (32) |
| item_number | Number | string (32) |
| description | Description | text |
| classification_hierarchy | Classification Hierarchy | text |
| label | Label | ml_string |
| select_only_leaf_class | Restrict Selection to only Leaf Classes | boolean |
| select_only_single_class | Restrict Selection to a Single Class | boolean |

According to embodiments, data model 1600 may further comprise xClassificationTree_ItemType RelationshipType 1610, which defines a list of dimensions available for xClassificationTree ItemType 1605. xClassificationTree_ItemType RelationshipType 1610 may further be associated with one or more ItemTypes 1615.

In various embodiments according to this disclosure, data model 1600 may further comprise xClass Relationship Type 1620. As noted elsewhere instances of XClass represent a concept named by a term, which in turn define a collection of properties, further specified by xClass_XProperty Definition Relationship Type 1625.

In the non-limiting example of FIG. 16, data model 1600 includes xClass_xPropertyDefinition Relationship Type 1625, which describes a link between a particular xClass and an xPropertyDefinition.

Additionally, data model 1600 may further comprise instances of xClass_xProperty_Flatten Relationship Type 1630, which, describes a link between a particular xClass and xPropertyDefinition, and which contains all of the xProperties of a given xClass, including both the xClass's own properties and its inherited properties. According to some embodiments, a list of inherited properties may be calculated based on a hierarchy reflected in xClassificationTree ItemType 1605. As shown in the non-limiting example of FIG. 16, xClass_xPropertyDefinition Relationship Type 1625 and xClass_xProperty_Flatten Relationship Type 1630, are in turn, lied to at least one instance of xPropertyDefinition ItemType 1635.

Figure 17:
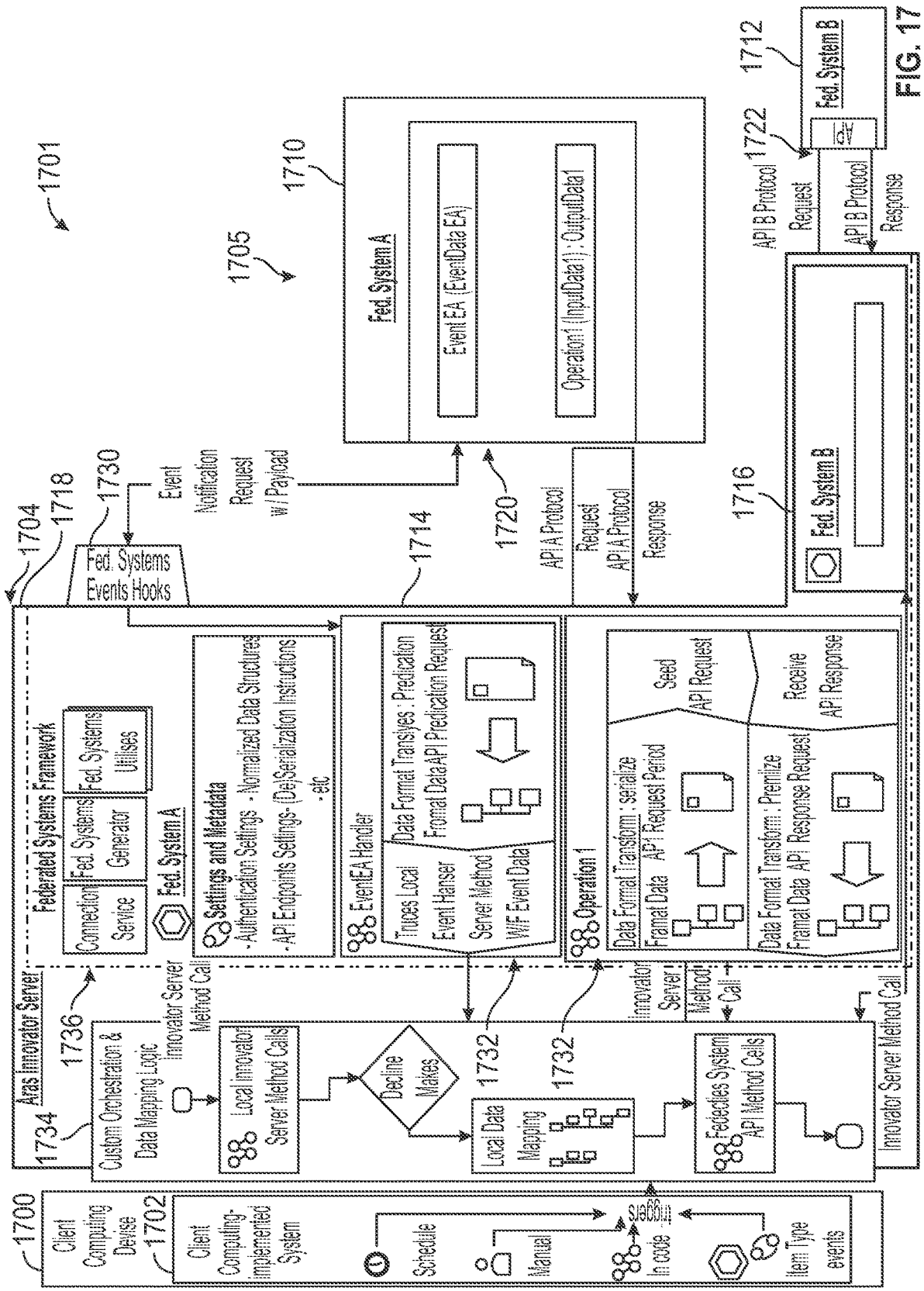
FIG. 17 illustrates an example architecture for providing federated services to federated systems using a self-describing data model according to embodiments of this disclosure.

FIG. 17 illustrates an example architecture 1701 for providing federated services to federated systems 1710 and 1712 using a self-describing data model according to embodiments of this disclosure. The federated services may enable aggregating data from disparate sources (e.g., the federated systems) using the self-describing data model. In some embodiments, virtual representations of the federated systems 1714 and 1716 may be generated by a computer-implemented system 1718 using the self-describing data model. The virtual representation may include logical model item types that define a schema used by an external object models of the federated systems 1710 and 1712. The federated services provided by the computer-implemented system 1718 may enable live data integration by not persisting the data from the federated systems 1710 and 1712 itself. In some embodiments, data synchronization and/or replication may be performed by the federated services to persist data in the self-describing data model of the computer-implemented system 1718 and/or the external object model of the federated system 1710 and 1712.

The term "federated system" and "third-party computer-implemented system" 1710 and 1712 may be used interchangeably herein, and may refer to a software application implemented in computer instructions stored on one or more memory devices and executed by one or more processing devices. In some embodiments, the computer-implemented system 1718 may also refer to a software application implemented in computer instructions stored on one or more memory devices and executed by one or more processing devices. The computer-implemented system may interact with a client computer-implemented system 1702 that also refers to a software application implemented in computer instructions stored on one or more memory devices and executed by one or more processing devices.

In some embodiments, the client computer-implemented system 1702 may execute on a client computing device 1700, such as a desktop computer, a laptop computer, a tablet computer, a smartphone, a server, or the like. In some embodiments, the computer-implemented system 1718 may execute on a computing device 1704, such as a desktop computer, a laptop computer, a tablet computer, a smartphone, a server, or the like. In some embodiments, the third-party computer-implemented system 1710 or 1712 may also execute on the computing device 1704 in conjunction with the computer-implemented system 1718. In some embodiments, the third-party computer-implemented system 1705 or 1712 may execute on a third-party computing device 1705 separate from the client computing device 1700 and the computing device 1704. The third-party computing device 1705 may be a desktop computer, a laptop computer, a tablet computer, a smartphone, a server, or the like. The client computing device 1700, the computing device 1704, and the third-party computing device 1705 may each include one or more memory devices, processing devices, network interface devices, and the like.

The memory devices may store instructions and/or data and may include non-volatile memory (e.g., a main memory (read-only memory (ROM)) and volatile memory (e.g., flash memory, solid state drives (SSDs), dynamic random access memory (DRAM) such as synchronous DRAM (SDRAM)), a static memory (e.g., flash memory, solid state drives (SSDs), static random access memory (SRAM)).

The processing devices may represent one or more general-purpose processing devices such as a microprocessor, central processing unit, or the like. More particularly, the processing devices may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing devices may also be one or more special-purpose processing devices such as an application specific integrated circuit (ASIC), a system on a chip, a field programmable gate array (FPGA), a digital signal processor (DSP), network processor, or the like. The processing devices are configured to execute instructions for performing any of the operations and steps discussed herein.

The network interface devices may enable communicatively coupling one or more other computing devices via a network using wired (e.g., Ethernet) or wireless (e.g., WiFi, Bluetooth, ZigBee, etc.) communication protocols. The processing devices, memory devices, and/or network interface devices associated with each of the client computing device 1700, the computing device 1704, and the third-party computing device 1705 may be communicatively coupled via a respective bus.

The disclosed embodiments may provide a technical solution to a technical problem. Various disparate federated systems may provide desired functionality that a computer-implemented system 1718 may benefit from. However, the disparate federated systems may store their data in data formats in external object models (e.g., data structures) that are different than a data format in which the computer-implemented system 1718 uses. For example, the computer-implemented system 1718 may use a self-describing data model, as described herein. In order to integrate the computer-implemented system 1718 and the federated system 1710 or 1712, the computer-implemented system 1718 may generate a representation 1714 and 1716 of the federated system in the self-describing data model. The representation 1714 and 1716 may be defined by various logical model item types that are mapped to the item types of the external model of the federated system 1710 and 1712. The mappings may be stored as mapping item types in the self-describing data system. Using the representation and various logic, operations, event handling techniques, transformations, etc. described herein, the computer-implemented system 1718 may enable bi-directional communication of data between the computer-implemented system 1718 and the federated systems 1710 or 1712, such that interoperability is enabled between computer-implemented systems. As a result, some of the disclosed embodiments may provide a technical solution to the technical problem described above.

Another benefit of some of the disclosed embodiments is providing an enhanced user interface on the client computing device 1700. The enhanced user interface is presented by the client computer-implemented system 1702 on a display screen of the client computing device 1700. The user interface enables a user to make a request for data from the computer-implemented system 1718 and/or the various federated systems 1710 and 1712 represented in the self-describing data model. Upon receiving a request for federated data, the client computer-implemented system 1702 may transmit a request for the federated data to the computer-implemented system 1718, which retrieves the data from the federated system. The federated data may be returned to the client computer-implemented system 1702 and presented in the user interface, without the user having to open the federated system separately from the client computer-implemented system 1702 on the client computing device 1700. In addition, the client computer-implemented system 1702 may present data associated with the computer-implemented system 1718 in conjunction with the federated data form the federated systems 1710 or 1712. Such techniques enable saving computing resources (e.g., processing, memory, etc.) by just executing the client computer-implemented system 1702 on the client computing device 1700 to obtain the federated data. Further, enabling a single user interface to present data from not only the computer-implemented system 1718 but any federated system that is represented in the self-describing data model may enhance the user's experience using the client computing device 1700, thereby improving technology. The user's experience may be improved by not having to switch between different user interfaces associated with each of the computer-implemented system 1718 and federated systems 1710 and 1712 to manage data associated with those respective systems.

As depicted, the federated system 1710 and 1712 are executing on third-party computing devices 1705. Each federated system 1710 and 1712 include an application programming interface (API) 1720 and 1722 that expose the external object model used by the federated system 1710 and 1712, as well as functions or operations that are allowed to be performed by systems connected to the APIs. In particular, the API may specify one or more operations and one or more input parameters to include in a request when calling the one or more operations. The API may define a protocol for request messages (e.g., format, input data, connection information, authentication protocol, etc.) and a protocol for response messages (e.g., format, output data, etc.). For example, the API may specify the output to expect in a response sent by the API as a result of performing the operation. The request and response messages may be in any suitable format, such as Extensible Markup Language (XML), JavaScript Object Notation), AML, etc. The API may also specify various events that may be triggered. The events may refer to an action or occurrence recognized by the federated system, and may originate asynchronously from an external or internal environment. The events may be generated or triggered by the federated system, by a user, or in other ways. When the events are triggered, an event notification request message may be transmitted by the API. The event notification request message may include a payload with data and/or information pertaining to the event, the API, the federated system, or some combination thereof. The events may be triggered when data is created, updated, deleted, etc. in the external object models used by the federated systems 1705. The external object models may be stored in a memory device of the third-party computing device 1705.

The computer-implemented system 1718 may execute a federated system event hooks module 1730 configured to receive information pertaining to one or more events from the third-party computer-implemented system 1710. In particular, the federated system event hooks module 1730 may be configured to receive an event notification request including a payload with data as a result of a data object creation, data object update, data object deletion, data lifecycle change, or some combination thereof. The federated system event hooks module 1730 may be implemented in computer instructions stored on one or more memory devices and executed by one or more processing devices. The federated system event hooks module 1730 may transmit the information in an event notification request to a corresponding event handler 1732 for an appropriate type of event.

The computer-implemented system 1718 includes federated systems framework 1736 and generic adapter 1734, among other components or modules. The federated systems framework 1736 and generic adapter 1734 may enables live data integration between the computer-implemented system 1718 and any suitable number of federated systems 1710, synchronized data between the computer-implemented system 1718 and any suitable number of federated systems 1710, integrated processes between the computer-implemented system 1718 and any suitable number of federated systems 1710, live data integration between any suitable number of the computer-implemented systems 1718, synchronized data between any suitable number of the computer-implemented systems 1718, integrated processes between any suitable number of the computer-implemented systems 1718.

In some embodiments, minimal or no coding is needed to perform an integration between the computer-implemented system 1718 and a federated system 1710. For example, graphical element-based user interfaces may be provided to establish connections between the computer-implemented system 1718 and the federated system 1710, as well as map item types and properties between the computer-implemented system 1718 and the federated system 1710. In some embodiments, the computer-implemented system 1718 may be configurable as to what data to integrate from the federated system 1710. For example, the representation that is defined in the self-describing data model may include item types associated with access control (logins, system protections), access points (URLs), etc. The computer-implemented system 1718 may provide a schema definition tool to allow external schemas of external object models of federated systems to be defined, a mapping tool to allow external classes and item types to be mapped to item types of the computer-implemented system 1718, and hooks to allow users (customers) to define their own methods for events, mappings, etc. The computer-implemented system 1718 may be extendible such that other federated systems 1710 may be subsequently added.

In some embodiments, an administrator of the computer-implemented system 1718 may define the external object model in the self-describing data model of the computer-implemented system 1718. For example, the definition of the external object model may be encapsulated in the representation of the federated system. The representation may include mappings of the item types of the external object model to the item types associated with the computer-implemented system 1718. The computer-implemented system 1718 may be configured to read and display data from one or more external object models from a federated system 1710. The computer-implemented system 1718 may be configured to write data to one or more external object models in a federated system 1710. The computer-implemented system 1718 may be configured to respond to events from itself or a federated system 1710.

The computer-implemented system 1718 may include various item types and properties in the representation of the federated system 1710 in the self-describing data model to perform live data integration. For example, a logical model item type may define logical model type (LMT) item types may be used to map to item types and properties in the external object models. The computer-implemented system 1718 may define a key to use to look up item types in the external object model (e.g., globally unique identifier (GUID), unique identifier (UI), etc.). In some embodiments, the computer-implemented system 1718 may create a proxy object (e.g., a federated system item having a federated system item type) that includes an identifier for the external object model of the federated system 1710. The computer-implemented system 1718 may load the logical model item including the LMT item types and properties for the proxy object when desired. The proxy object may be an instance of the representation of the federated system that includes the LMT item types and properties loaded at runtime. In some embodiments, the representation of the federated system may be read at runtime by performing the mappings between the LMT item types and the item types of the external object models. In some embodiments, the representation of the federated system may be read and stored in memory by the computer-implemented system 1718. In some embodiments, the item types of the computer-implemented system 1718 may reference the LMT item types of the representation of the federated system. Using the disclosed techniques, the computer-implemented system 1718 may provide live data access to the data of one or more federated systems 1710 or 1712. The data from the federated systems may be current and accurate by performing synchronization and replication techniques, and may be read-only or read-write.

In some embodiments, the attributes from the external object model may be mapped into the properties of LMT item types and a key may be defined to use to look up objects in the external object model. The computer-implemented system 1718 may load the properties for the LMT item types when the representation of the federated system is loaded.

As depicted, the federated systems framework 1736 includes a connection services configured to establish connections with federated systems 1710 and 1712 and/or their APIs 1720 and 1722, as well as with the client computer-implemented system 1702. The connection services may use information related to access points, IP addresses, URLs, or the like, as well as authentication protocols and/or credentials to enable establishing connections with various systems. The connection systems may also include logic for disconnecting connections between the computer-implemented system 1718 and other systems or services.

The federation systems framework 1736 may also include a federated systems generator. The federated systems generator may be implemented in computer instructions stored on one or more memory devices and executed by one or more processing devices. The federated systems generator may generate a representation of the federated system in the self-describing data model. For example, the federated system generator may generate a logical model item (e.g., federated system item) having a logical model item type (e.g., federated system item type) that is used to define the third-party computer-implemented system.

The logical model item type may include various logical model type (LMT) item types used to define the various item types in a schema of an external object model of the third-party computer-implemented system. The federated systems generator may generate any suitable number of representations of federated systems in the self-describing data model. The representations may include numerous different types of item types, such as mapping item types that define a mapping between the LMT item types and item types of the external object model or a normalized data object model, connection item types describing connection parameters (e.g., Internet Protocol (IP), Universal Resource Locator (URL), authentication protocols, credentials, etc.) associated with the federated systems, action item types that define actions of the LMT item types, property item types that define properties of the LMT item types, event handling item types that define operations to perform for various events triggered by the client computer-implemented system 1702, the computer-implemented system 1718, or the third-party computer-implemented system 1710.

In an example use case, a user may desire to build a federated system item for a federated system in the self-describing data model of the computer-implemented system 1718. The federated system may use a protocol (e.g., proprietary protocol and/or standardized protocol, such as OData, OpenAPI, etc.) to intercommunicate with the federated system. The federated system generator may be pointed to a connection location (e.g., URL) of the federated system, which may enable the federated system generator to process and learn the protocol of the federated system. The federated system generator may use the protocol to generate any number of representations of the federated system within the computer-implemented system 1718 that describes that federated system, such as authentication parameters, available actions for intercommunication with the federated system, events that the federated system can publish, and logical models that represents a schema of data of an external object model in the federated system, as further described herein. The federated system generator may be plugged in to support the protocol used by the federated system, and thus, the federated system generator may be directed to any instance/installation of the federated system to generate a federated system item definition in the self-describing data model.

The federated systems framework 1736 may also include federated systems utilities. The federated systems utilities may include the functionality and operations to perform data management between the computer-implemented system 1718 and the various federated systems 1710 and 1712.

The federated systems framework 1736 includes the two depicted representations 1714 and 1716 (e.g., federated system items or logical model items) federated systems 1710 and 1712 depicted. It should be noted that any suitable number of representations of federated systems may be generated. Each representation 1714 may include various settings and metadata, event handlers, and/or operations. The settings and metadata may include authentication settings, API endpoint settings, normalized data object structures, serialization instructions, deserialization instructions, and the like. The authentication settings may pertain to authentication protocols used by each of the federated systems 1710 and 1712. The API endpoint settings may pertain to a specific URL of the API, for example. The normalized data structures may refer to data structures that include a common set of item types and properties that are mapped to by more than one object model. For example, the external object model may include item types that are mapped to normalized data object (NDO) item types, and the NDO item types may also be mapped to LMT item types. The NDO may be used to transform data received from the federated system in a first format to a second format compatible with the self-describing data model of the computer-implemented system 1718, and vice versa. The serialization and deserialization instructions may include transformation instructions regarding API event payloads, API requests payloads, API response payloads, etc. and corresponding event data, input data, and output data. The settings and metadata may be saved as item types associated with the representation 1714 of the federated system in the self-describing data model.

The representation 1714 of the federated system may also include an item type for each event handler 1732 associated with a particular event related to the computer-implemented system 1718, the client computer-implemented system 1702, and/or the third-party computer-implemented system 1710. As depicted, an event notification request with a payload has been received at the federated systems events hooks module 1730 from the API 1720. The payload may be routed to the event handler 1732 of representation 1714 that is responsible for that type of event (event A). The event handler 1732 may reference the settings and metadata item types to obtain the deserialization instructions or serialization instructions. As depicted, the event handler 1732 deserializes the event payload into event data and performs a method call with the event data to the generic adapter 1734. The event data may be deserialized into the normalized data object that is used by the generic adapter 1734 to map the normalized data object to one or more LMT item types of the representation 1736 or item types associated with the computer-implemented system 1718.

The generic adapter 1734 may be implemented as computer instructions stored on one or more memory devices and executed by one or more processing devices of the computing device 1704. The generic adapter 1734 may provide an interface to federated services implemented in computer instructions. The generic adapter 1734 allows for separation of the federation services from other services and/or operations of the computer-implemented system 1718. The generic adapter 1734 may include instructions that, when executed, cause the processing device to perform a requested method call, make a determination, perform logical data mapping (e.g., of the item types of the external object model to the LMT item types, of the item types of the normalized data object to the LMT item types or the item types of the external object model, etc.), and/or perform an API method call to a specified API of a federated system 1710 or 1712 (e.g., by generating an API request). The generic adapter 1734 may provide mapping definitions and processing, and event processing/message processing. The generic adapter 1734 may make API calls (e.g., Open Data Protocol (ODATA)) that provide various functionality: login/logout (proxies); get objects, properties, and relationships; get related objects, (relationship and object), get structure of external object model; set objects, properties, and relationships; attach objects (using relationships); and find objects. These various API calls may be made when loading objects, while mapping data, and/or writing to objects, for example.

For example, the representation 1714 of the federated system may include one or more operation item types that is defined based on an API that is exposing the operation. For example, the operation item type may specify how to serialize input data from a method call made by the generic adapter 1734 into an API request payload and transmit the API request payload to the API 1720. Further, the operation item type may specify how to deserialize an API response payload that is received from the API 1720 into output data that is transmitted to the generic adapter 1734 for processing.

As depicted, the client computer-implemented system 1702 may specify various triggers that cause requests to be transmitted to the computer-implemented system 1718 (e.g., generic adapter 1734). For example, the requests may be triggered based on a schedule (e.g., data synchronization, data creation, data updates, data deletion, etc.), may be manually triggered (e.g., a user uses the user interface to request to view, edit, create, delete data of the computer-implemented system 1718 and/or the federated systems 1710 and 1712), may be triggered based on a decision made in logic implemented by computer instructions, and/or may be triggered based on an event that occurs to a certain item type.

Figure 18:
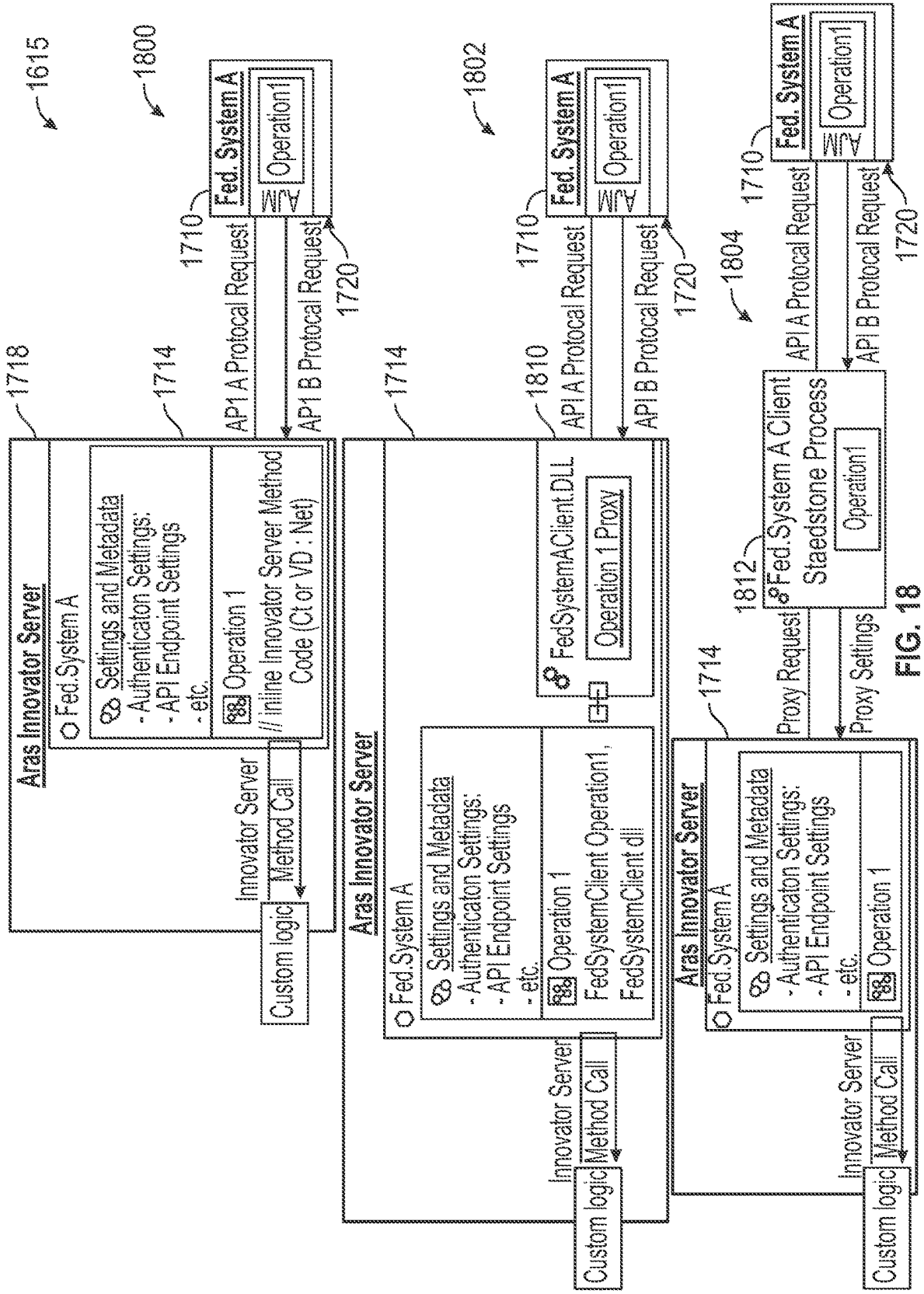
FIG. 18 illustrates example architectures for a computer-implemented system interacting with a third-party computer-implemented system via an application programming interface according to embodiments of this disclosure.

FIG. 18 illustrates example architectures 1800, 1802, and 1804 for a computer-implemented system 1718 interacting with a third-party computer-implemented system 1710 via an application programming interface 1720 according to embodiments of this disclosure. As depicted in the architecture 1800, in some embodiments, the representation 1714 of the third-party computer-implemented system 1710 may include an operation item type that is leveraged by inline method computer instructions of the computer-implemented system 1718 to directly call operations of the API 1720. As depicted in the architecture 1802, in some embodiments, the representation 1714 of the third-party computer-implemented system 1710 may include an a dynamic link library (DLL) 1810 that defines and instantiates an operation proxy to perform operation calls with the API 1720 at runtime. As depicted in the architecture 1804, in some embodiments, the representation 1714 of the third-party computer-implemented system 1710 may include an operation item type that makes a request to an external standalone process (e.g., Microservice, WinService, etc.) to perform an operation of the API 1720.

Figure 19:
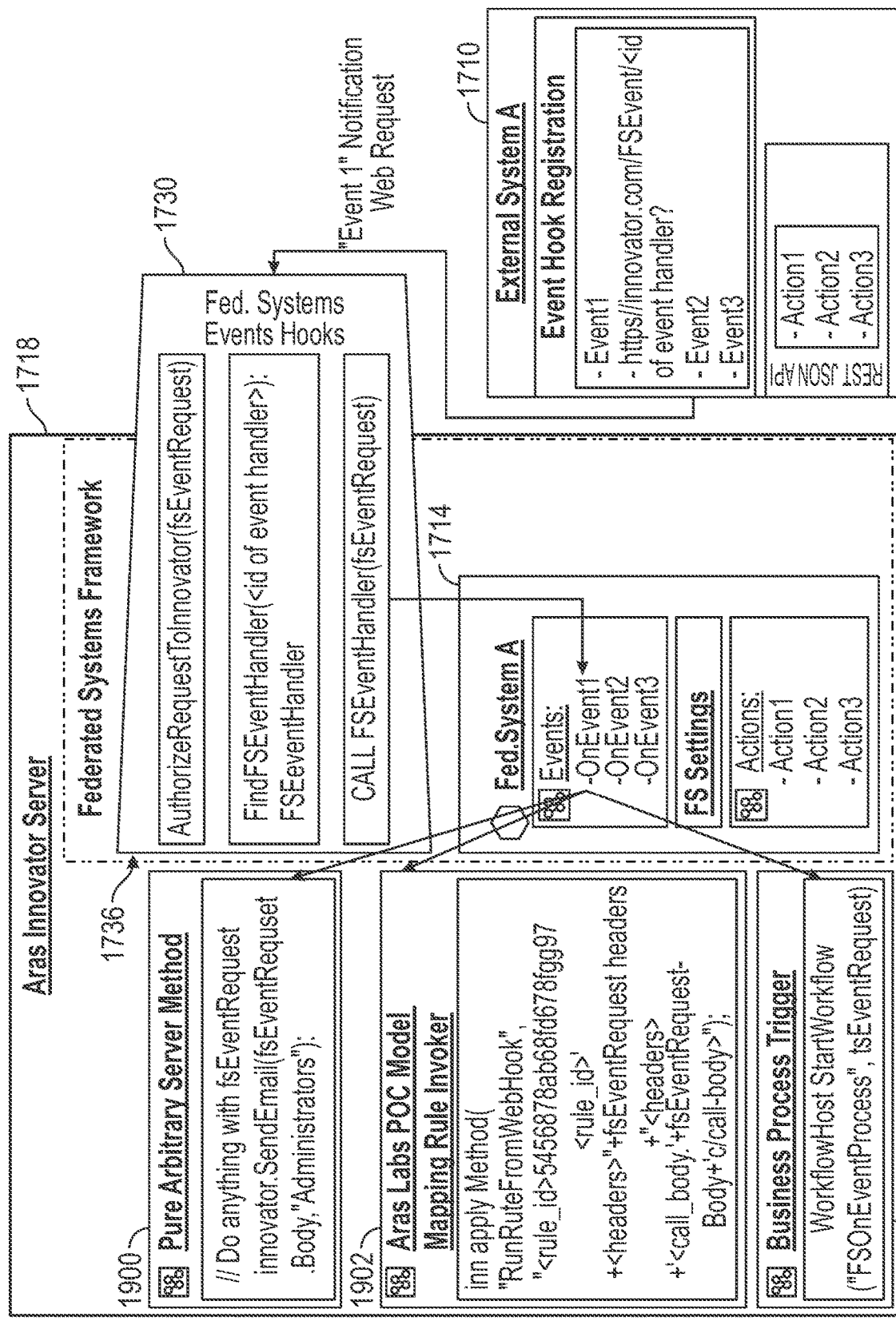
FIG. 19 illustrates an example flow diagram for event handling within a computer-implemented system according to embodiments of this disclosure.

FIG. 19 illustrates an example flow diagram for event handling within a computer-implemented system according to embodiments of this disclosure. The example flow diagram depicts federated system 1710 including an event hook registration module. The event hook registration module defines three events (Event1, Event2, Event3), and includes a URL with the id of an event handler for Event1. Upon a trigger event associated with Event1 occurring, the event handler at the URL may be sent a notification web request. The federated systems events hooks module 1730 may receive the request and perform various operations. For example, the federated system events hooks module 1730 may authorize the request to the computer-implemented system 1718, find the appropriate event handler using the id of the event handler for Event1, and may call the appropriate event handler if found. The event item type for Event1 (OnEvent1) may be called using the representation 1714 of the federated system 1710, which may be running as a proxy object for the external object model. The event item type for Event1 may cause various logic to be executed by the generic adapter 1734. For example, as depicted by box 1900, Event1 may cause any suitable operation to be performed by the computer-implemented system 1718, such as sending an email, modifying data, creating data, deleting data, executing a process, etc. As depicted by box 1902, a mapping rule invoker may execute upon Event1 occurring. The mapping rule invoker may execute a particular rule based on Event1 occurring and the rule may be called with a name, a rule identifier, header, and body. As depicted by box 1906, a business process may be triggered by Event1 where a certain workflow is initiated based on Event1.

Figure 20:
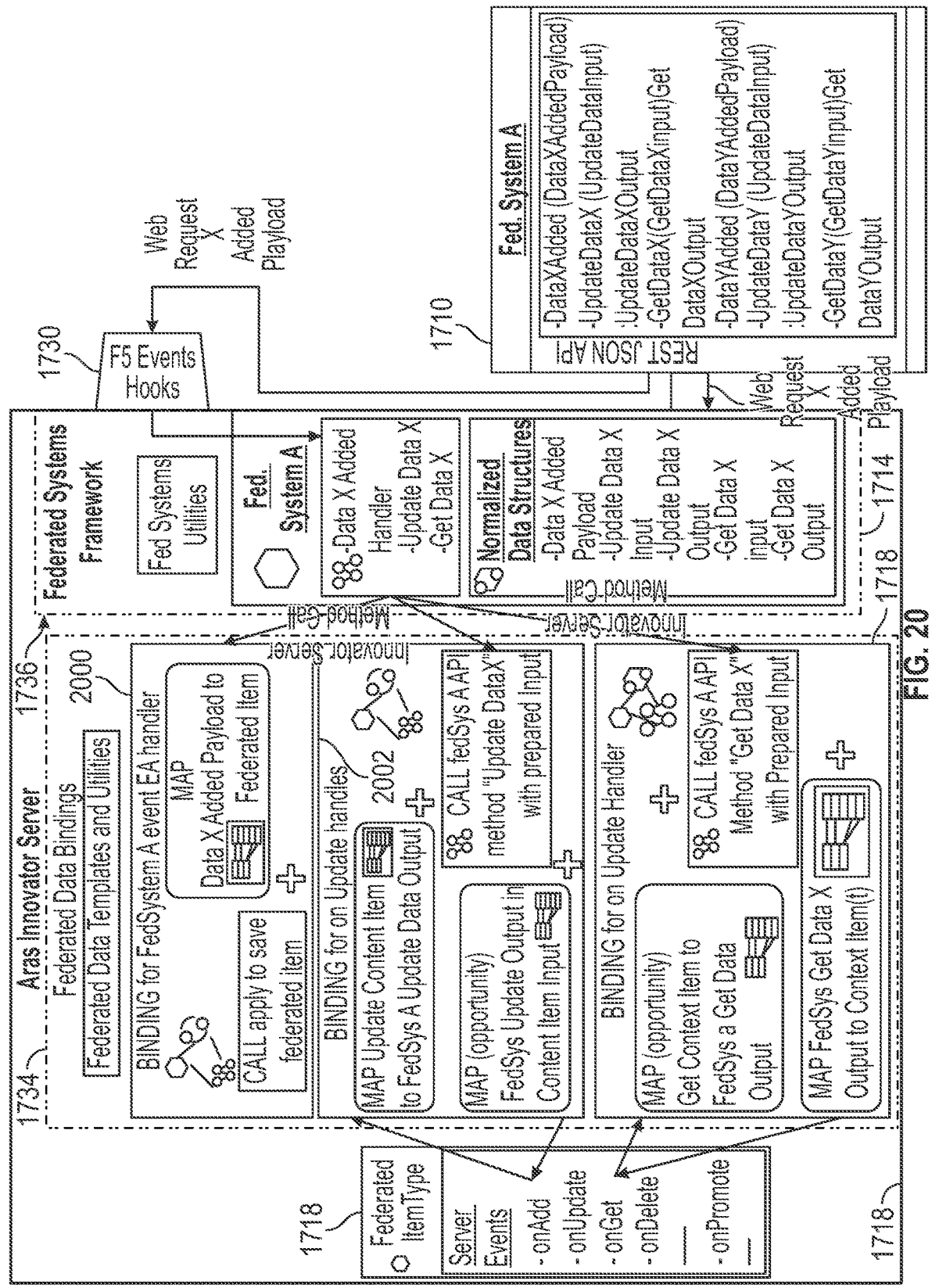
FIG. 20 illustrates an example flow diagram for data bindings within a computer-implemented system according to embodiments of this disclosure.

FIG. 20 illustrates an example flow diagram for data bindings 2000 within a computer-implemented system according to embodiments of this disclosure. As depicted, various data bindings may be performed by the generic adapter 1734. In a first example shown in binding 2000 for the federated system 1710 event handler, the generic adapter 1734 may receive a payload for data X being added to the external object model of the federated system 1710. The payload may be deserialized by the event handler in the representation 1714 of the federated system 1710, and thus, may be a normalized data object.

The representation 1714 may perform a get request, such as an API web request ("GetDataX"), from the federated system 1710. The representation 1714 may implement one or more functions in computer instructions that perform operations for parsing a data format in which the data is received from the federated system 1710. For example, the operations may parse AML. For a response, the representation 1710 may autofill portions of adapters from the parsed AML request to the system 1710 and map data from the parsed AML request to an internal LMT item type. Accordingly, the get request may be automatically or partially automatically enabled to parse an AML request and/or response internally to the computer-implemented system 1736 and map the fields to appropriate adapters.

In some embodiments, the get request may load raw results received from the federated system 1710. The raw results may be in formatted via a schema of an external object model used by the federated system 1710. The get quest may include computer instructions that enable converting raw results to item objects. The conversion may map the data in the format received from the federated system 1710 to LMT item type of the self-describing data model. Such techniques provide the benefit of integrating external systems into the self-describing data model system that uses XML and/or AML, for example. In some embodiments, one or more user interfaces may present fields that enable a user to interact with federated data from the federated system 1710 using services including AML.

The generic adapter 1734 may map the normalized data object to one or more logical model type (LMT) item types associated with the representation 1714 and may save the data to the self-describing data model. Binding 2002 may be triggered when an update occurs to LMT item type in the self-describing data model. The update may result from the user using the user interface of the client computer-implemented system to update the federated data associated with the LMT item type. The generic adapter 1734 may map the LMT item type to a normalized data object for the federated system 1710 and may call an operation item type (e.g., UpdateDataX) for an update API method call of the API of the federated system 1710. The operation item type may be included in the representation 1714. The input provided to the operation item type may be transformed (e.g., serialized) into an API request. If a result is received from the API at the generic adapter 1734, the generic adapter 1734 may map result to the associated LMT item type in the self-describing data model. Binding 1718 may be triggered when a request is made to retrieve federated data from the federated system 1710. The generic adapter 1734 may map the LMT item type associated with the requested data to a normalized data object and call an operation item type (e.g., GetDataX). The operation item type may transform the input (normalized data object) to an API request for the API of the federated system 1710. The result of the get operation may be the requested data that is deserialized by the operation item type into the normalized data object, which is passed to the generic adapter 1734. The generic adapter 1734 may map the normalized data object to the LMT item type associated with the requested data and transmit the requested data to be presented on the user interface of the client computer-implemented system 1702.

Figure 21:
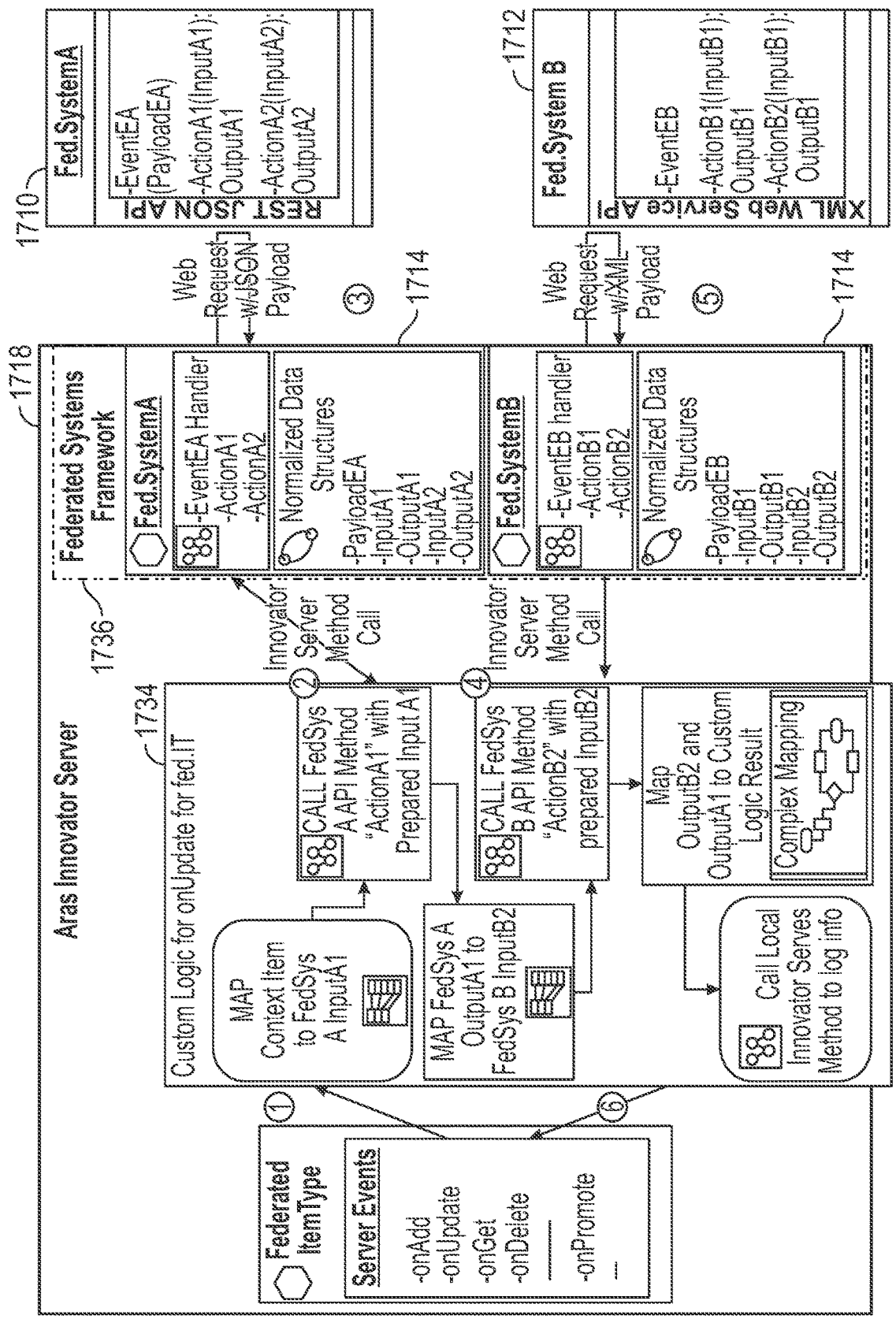
FIG. 21 illustrates an example flow diagram for performing an update operation within a computer-implemented system according to embodiments of this disclosure.

FIG. 21 illustrates an example flow diagram for performing an update operation within a computer-implemented system according to embodiments of this disclosure. The depicted example illustrates mapping the outputs from two federation systems 1710 and 1712 using the generic adapter 1734. As depicted, an event is triggered to update data in the external object model of the federated system 1710. The event may be triggered based on a schedule, the user requesting the update (e.g., received from the client computer-implemented system 1702), another event occurring, or the like. The generic adapter 1734 may map the LMT item type associated with the data to a normalized data object associated with a particular action (ActionA1) defined in an event handler for the representation 1714 of the federated system 1710. The normalized data object may be input (InputA1) to the particular action and may be transformed to an API request sent to the API of the federated system 1710. The API may return a response with a payload including a particular output (OutputA1). The generic adapter 1734 may map the output from the federated system 1710 to a normalized data object associated with an input (InputB2) of a particular action (ActionB2) defined in an event handler for the representation 1716 of the federated system 1712. The normalized data object may be input (InputB2) to the particular action and may be transformed to an API request sent to the API of the federated system 1712. The API may return a response with a payload including a particular output (OutputB2). The generic adapter 1734 may map OutputB2 and OutputA1 to respective portions (e.g., LMT item types) of the self-describing data model or perform any suitable function (e.g., present one or both OutputB2 and OutputA1 on a user interface of the client computer-implemented system, log OutputB2 and OutputA1). As should be appreciated, the generic adapter 1734 is enabled to perform different action or operation calls to different federated systems 1710 and 1712, as well as perform local operation calls for the computer-implemented system 1718.

Figure 22:
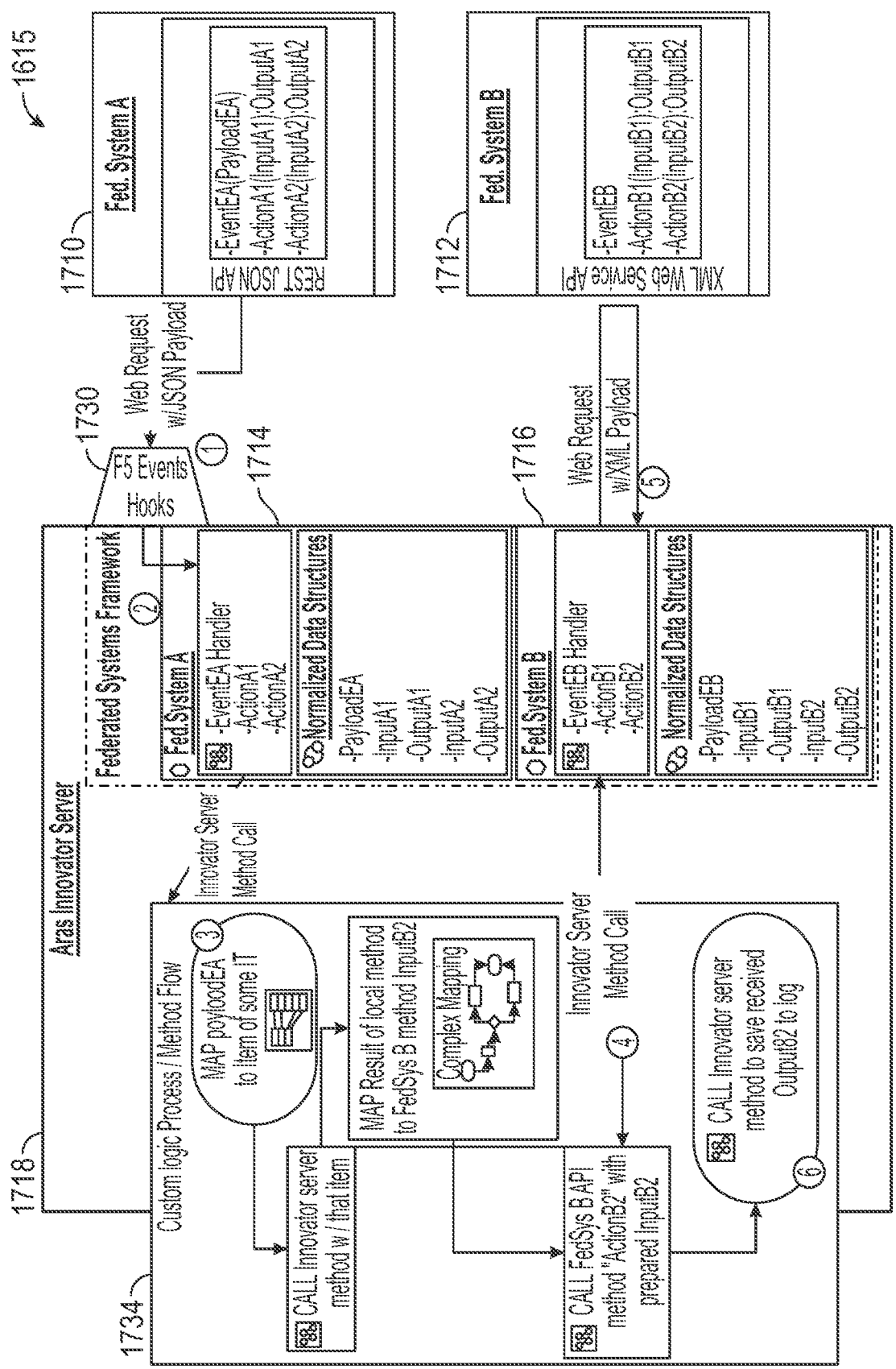
FIG. 22 illustrates an example flow diagram for performing operations between a computer-implemented system and two third-party computer-implemented systems according to embodiments of this disclosure.

FIG. 22 illustrates an example flow diagram for performing operations between a computer-implemented system and two third-party computer-implemented systems according to embodiments of this disclosure. As depicted, the federated system 1710 triggers an event (EventEA) and transmits a corresponding web request including a payload having a particular format (JSON). The web request is received by the federated systems events hooks module 1730 and the payload is transmitted to a corresponding event handler, which transforms the payload into a normalized data object (PayloadEA). The event handler calls a function call of the generic adapter 1734, which maps the normalized data object to an item having a LMT item type associated with the data in the normalized data object. The generic adapter 1734 may perform the requested action using the mapped data and map the results to a particular input (InputB2) of an API method for the federated system 1712. The generic adapter 1734 may call a particular action (ActionB2) defined in an event handler for the representation 1716 of the federated system 1712. The normalized data object may be input (InputB2) to the particular action and may be transformed to an API request sent to the API of the federated system 1712. The API may return a response with a payload including a particular output (OutputB2). The generic adapter 1734 may perform any suitable action (e.g., log OutputB2, perform a function using OutputB2, etc.).

Figure 23:
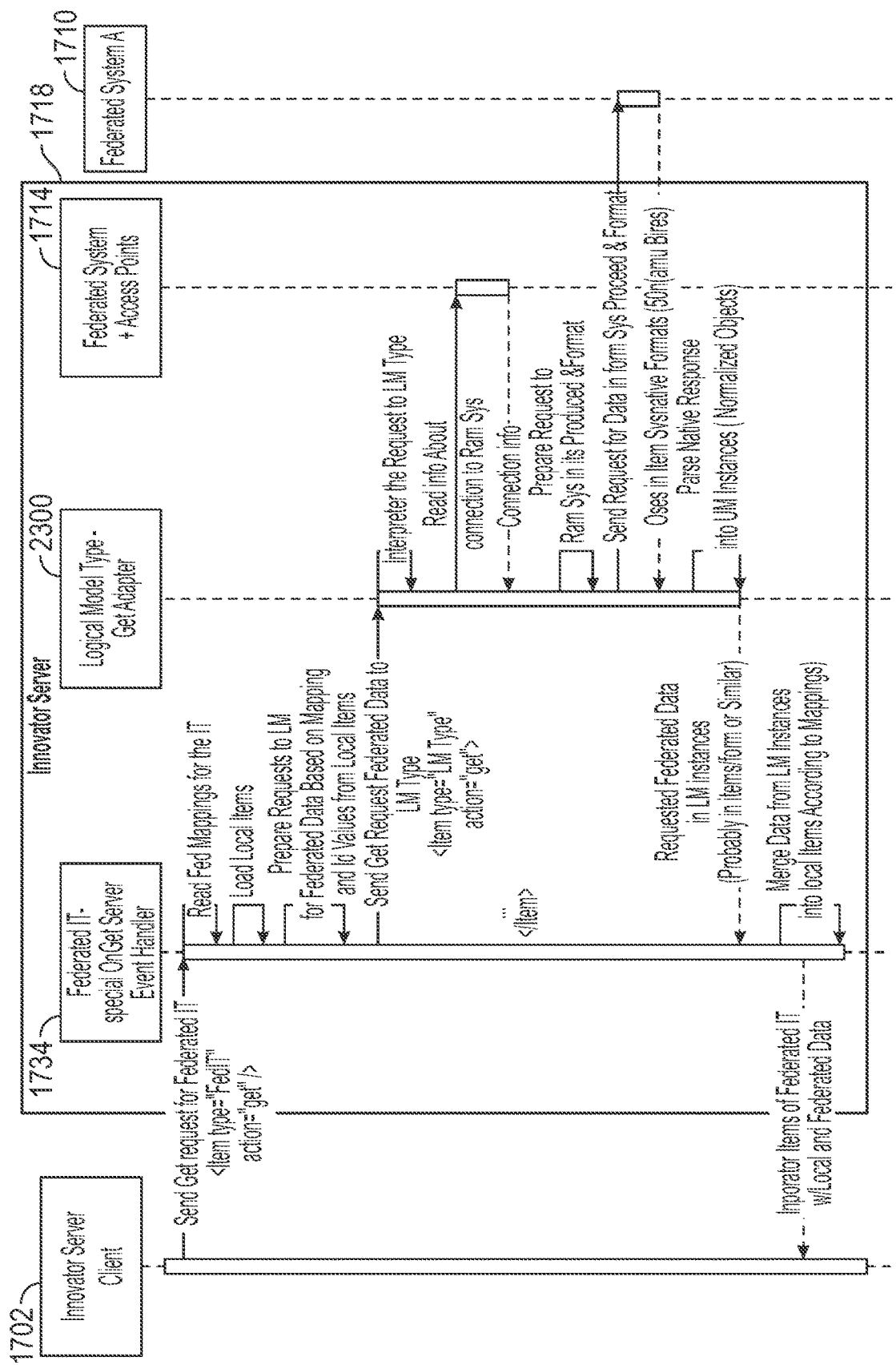
FIG. 23 illustrates an example sequence diagram for a client computing device using a computer-implemented system executing a self-describing data model to obtain data from a third-party computer-implemented system according to embodiments of this disclosure.

FIG. 23 illustrates an example sequence diagram for a client computing device 1700 using a computer-implemented system 1718 executing a self-describing data model to obtain data from a third-party computer-implemented system 1710 according to embodiments of this disclosure. The client computing device 1700 may execute the client computer-implemented system 1702, which may generate and transmit a get request message for data of a federated system 1710. The data may be associated with a schema that has mapped to a logical model type (LMT) item type associated with a logical model item representation of the federated system 1710 in the self-describing data model. In some embodiments, the get request message is triggered as an event. The generic adapter 1734 may execute an event handler to read mappings for the LMT item type associated with the data, load local items that are associated (e.g., have relationship with) the LMT item type, and prepare a request to a logical model item type of the federated system 1710 based on the mapping and identifier values from the local items. The generic adapter 1734 event handler may transmit the request for the federated data to the logical model item type adapter 2300. The logical model item type adapter 2300 may process the request and may retrieve connection information from the representation 1714 of the federated system 1710. The logical model item type adapter 2300 may prepare a request to the federated system 1710 API in the format specified for the API and using an authentication protocol and the connection information. The logical model item type adapter 2300 may transmit the request to the API. The API may return a response in the format of the federated system 1710. The logical model item type adapter 2300 may parse the response from the API and deserialize it into a normalized data object. In some embodiments, the response may be parsed into logical model item types. The generic adapter 2300 may receive the normalized data object representing the federated data and may merge the local items and the federated data based on the mappings. The items having the LMT item types including the local and federated data may be transmitted to the client computer-implemented system 1702 for presentation.

Figure 24:
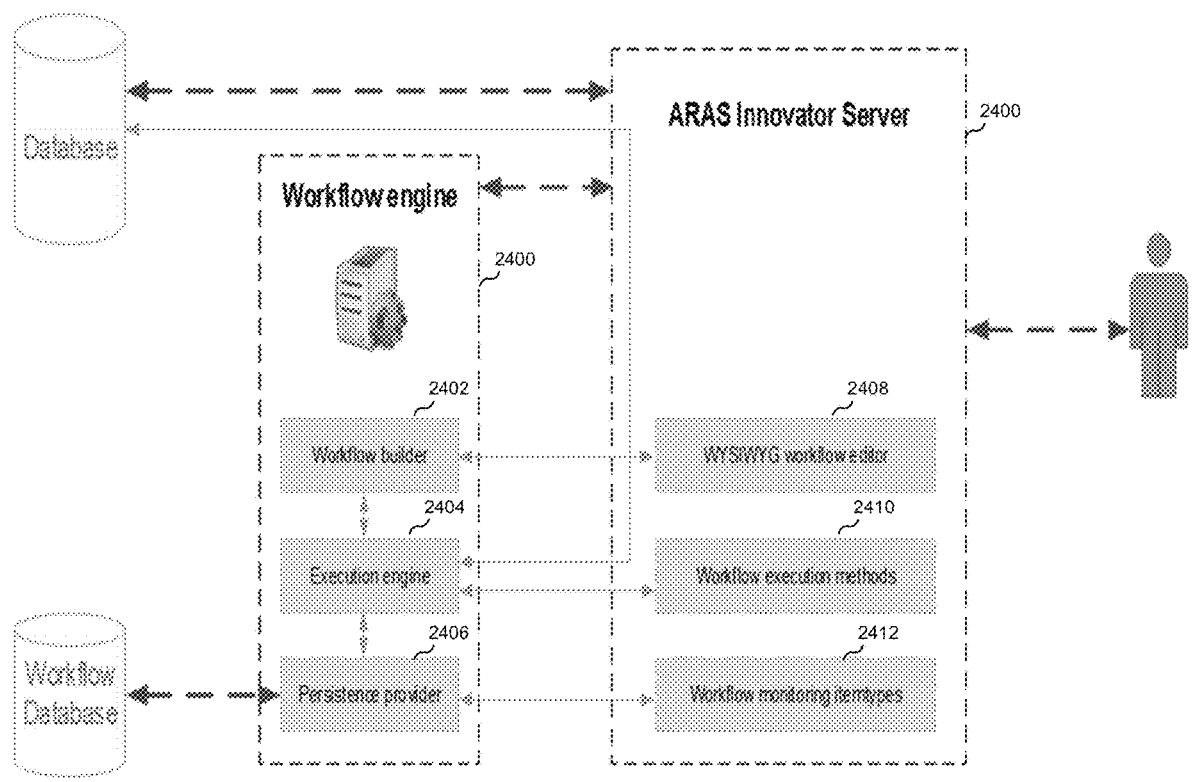
FIG. 24 illustrates an example workflow engine according to embodiments of this disclosure.

FIG. 24 illustrates an example workflow engine 2400 according to embodiments of this disclosure. The workflow engine 2400 is depicted as separate from the computer-implemented system 1718 but in some embodiments may be a component or module included in the computer-implemented system 1718. The workflow engine may be implemented in computer instructions that are stored on one or more memory devices and executed by one or more processing devices. The workflow engine may be a software application or tool designed to help users enforce a series of recurring tasks that make up a process or workflow. The workflow engine takes cues from the workflow's design and guides the process through its various steps.. This may be enabled by task routing (e.g., workflow automation).

A workflow management system (WfMS) may refer to a package that supports the definition, enactment, and control of workflow definitions, while allowing interactions of users and external software applications/systems. The WfMS may include editors to create the definitions, management applications to control the execution, client applications to allow the interaction of userse, and monitoring applications which track the execution of the workflows and are used to derive and register relevant metrics. The WfMS may use the workflow engine to load and instantiate workflow definitions, and enacts them according to semantics of the workflow specification language being used.

The workflow engine may generate various workflows, which refers to a formal definition of a type of process for handling objects of a certain item type (e.g., the process for dealing with a ticket in the ticket-tracker). A workflow may refer to a series of repeatable tasks that lead to accomplishing some sort of goal. A case may refer to a single instance of a workflow, operating on a single object of a given type. A task may refer to a single atomic step in a workflow. A workflow engine may refer to a software application or tool designed to process workflows. An example workflow may include a finite-state machine (FSM).

As depicted, the workflow engine 2400 includes various components or modules, such as a workflow builder 2402, an execution engine 2404, and a persistence provider 2406. The computer-implemented system 1718 may include various components or modules that interact with the components or modules of the workflow engine, such as a workflow editor 2408, workflow execution methods 2410, and workflow monitoring item types 2412. The user may use the workflow editor 2408 to interact with the workflow builder 2402 to build a workflow. A sample workflow may include searching for items of particular item types in the self-describing data model. The items may be local items associated with the computer-implemented system 1718 and/or federated items associated with the federated system 1710. The execution engine 2404 may execute the workflow by calling various operations using the execution methods 2410, and the persistence provider 2406 may save the workflow to a workflow database. The persistence provider 2406 may also interact with the workflow monitoring item types 2412.

The workflow models in a graphical language may be modeled using two types of objects: node and control flow. Node may be classified into two subclasses: task and condition. A task can be graphically represented by a shape (e.g., rectangle) and may represent the work to be done to achieve some objectives. It is also used to build sequential, concurrency, and synchronization structures. It is a primary object in workflow specifications and could represent both automated and manual activities. Tasks are executed by assigned performers. A condition can be graphically represented by a shape (e.g., circle) and may be used to construct or-split and or-join structures. A control flow may link two nodes in the graph and may be graphically represented by a directed edge. By connecting nodes with control flows through five modeling structures, a directed acyclic graphs (DAG) called workflow graphs can be generated where nodes represent vertices and control flows represent directed edges. Vertices may be referred to as nodes and edges may be referred to as flows.

A sequence may refer to a basic modeling structure and may define the ordering of task execution. It may be constructed by connecting at the most one incoming and one outgoing flow to a task. A concurrency structure may be used to represent concurrent paths within a workflow graph and may be modeled by connecting two or more outgoing flows to a task. At certain points in workflows, it may be desired to wait for the completion of more than one execution path to proceed further. A synchronization structure, represented by more than one incoming flow to a task, may be applied to synchronize such concurrent paths. A synchronization task waits until all the incoming flows have been triggered.

A choice structure may be used to model mutually exclusive alternative paths and may be constructed by attaching two or more outgoing flows to a condition object. At runtime, the workflow may select one of the alternative execution paths for a given instance of the business process by activating one of the outgoing flows originating from the choice condition object. The choice structure may be exclusive and complete. The exclusive characteristic may ensure that only one of the alternative paths is selected. The completeness characteristic that, if a condition object is activated, one of its outgoing flows will always be triggered. A merge structure is "opposite" to the choice structure. It is applied to join mutually exclusive alternative paths into one path by attaching two or more incoming flows to a condition object.

Since a workflow model is represented by a directed acyclic graph (DAG), it has at least one node that has no incoming flows (source) and at least one node that has no outgoing flows (sink). These nodes may be referred to as initial and final nodes, respectively. To uniquely identify a final node for a workflow graph, all split structures may be joined. Therefore, a workflow graph may contain only one initial and one final node. A workflow instance may complete its execution after its final node has completed its execution.

An iteration structure may be used to model the repetition of a group of tasks within a workflow. The iteration is modeled through block structures. As long as a certain condition is met, a sub graph of the workflow is repeated.

A nesting structure may simplify the workflow specifications through abstraction. Using this construct, a workflow specification can be encapsulated into a task and then use that nested task in other workflow specifications. For each execution of a nested task, the underlying workflow may be executed.

A workflow management coalition identifies four primary workflow control structures: or-split, or-join, and-split, and and-join. These are represented in the workflow model through choice, merge, concurrency, and synchronization structures, respectively. The condition object may model the choice and merge structures. The concurrency and synchronization structures may be represented by directly connecting flows to tasks. This approach reduces the number of modeling objects but at the same time allows explicit notation for workflow structural models. Null tasks may be used, and the null tasks purpose may be to coordinate flow and compliance to the syntactical correctness criteria of workflow structures.

In some embodiments, the workflow engine may define the workflow modelling structures (sequence, choice, concurrency, etc.). Sequential, iterative and conditional structures may be used, and in some embodiments, may be used in parallel. In some embodiments, a workflow may be parameterized by an input item to process single workflow scheme multiple times for different data sets. The workflow engine may perform an action that outputs, for example, a notification, email, and/or posts data.

A task can have multiple inputs and outputs. Outputs of one task can be inputs of another task. The execution of a task may be be atomic to the system. For example, either the task completes, or it doesn't do anything. Since tasks take time, the workflow engine may include a start, commit, delay, and/or rollback mechanisms.

In some embodiments, the workflow engine may include a mechanism of prioritizing tasks in the work list. As many tasks are executed tasks, the workflow engine may define which tasks should be finished before current one is started. Each task can have a deadline, a date by which is must be performed. A task may have an entry to estimate how long it will take for completion. Alternatively, we can specify a specific point in time, the automatic task should finish.

In some embodiments, a mechanism may notify about changing case and/or task state. For example: a new task arrives, a task is finished, a task gets unassigned, a task is started, a task is finished (committed), a task is canceled (rolled back), and/or a task times out and is canceled.

A message from an external source may be passed to the task in order such that messages from external software/systems may be sent to the task. The same workflow definition may be started multiple times with different input parameters. In some embodiments, the workflow engine can start, cancel, suspend, and/or resume a workflow. In some embodiments, case state may be restored and resumed workflow execution after workflow engine has stopped and then started again. In some embodiments, the workflow engine may define a reusable workflow, which can be stored in a data store and be executed multiple times. The workflow engine may obtain an executing cases list. The workflow engine may start a workflow automatically after some event is triggered. In other words, one workflow should be possible to start another one.

The workflows may be composable through a concept of sub-workflows. The workflow engine may be customizable and extendable. For example, plug-in modules may enable workflow engine to communicate with other (internal or external) engines and system, and pre-defined tasks may be customizable via various input parameters. Custom tasks may be implemented. Versioning of workflow schemas may be supported. It may be possible to manually control the workflow instances that are currently executing. In some embodiments, simulation of workflow execution for debugging and testing purposes is enabled.

In some embodiments, a conversion task processor may be implemented using the workflow engine 2400. The workflow engine 2400 may enable designing custom processes using complex data mapping. In some embodiments, a data object may store conversion task processing workflow data and a ConversionTaskId may be input to an initialization step of a conversion task processing workflow. The initialization step may receive the ConversionTaskId and generate a ServerConnection, an instance of the computer-implemented system, and a ConversionTask to the conversion task workflow data. A next step may include an apply item step where an action is performed to apply a constant lock to an item. If the lock is applied to the item, a successful result may be sent to the conversion task processing workflow data. A next step may include determining whether a condition is satisfied. In one example, the condition pertains to is a conversion task successfully locked. If yes, an update conversion task step may be performed by the workflow engine, where the update conversion task step executes the conversion task, determines a status, defines when to start the conversion, and defines when to finish the conversion. A next step may include a start watchdog step, where the a watchdog software application is started and a delay of a certain amount of time is defined. The workflow engine may proceed until the conversion task is complete.

In some embodiments, the workflow engine may implement a data model for a federated system descriptor, hook handlers for federated system events (e.g., work flow API to call and method template for federated system event hook method), event handlers for federated system events (e.g., API to call and method template for custom event handler), and federated system actions (e.g., API to call and method for federated system action execute method). An instance of a work flow may enable migrating XML/AML, to objects representing payload for a work flow API and federated system actions and events.

Figure 25:
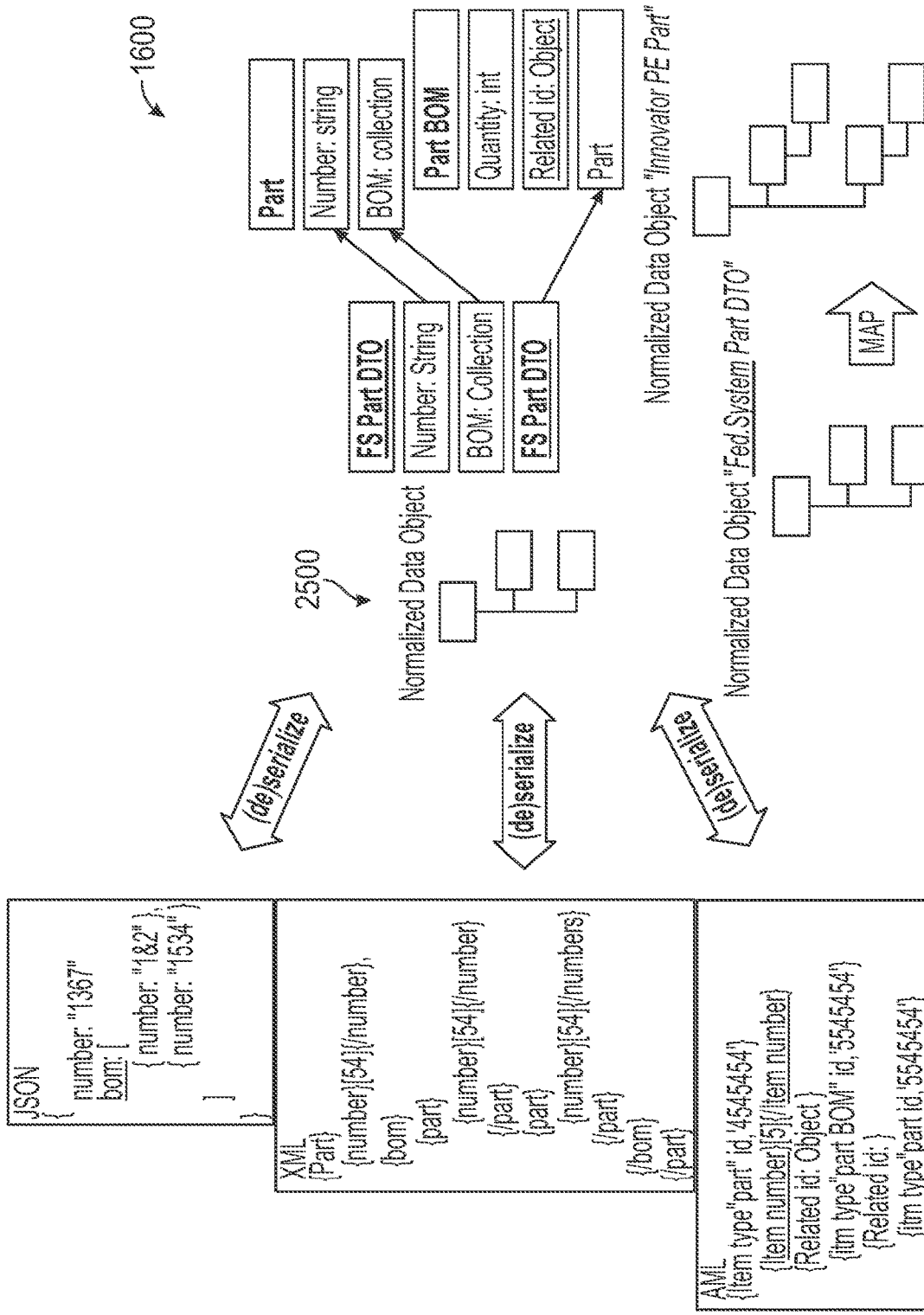
FIG. 25 illustrates example mapping operations according to embodiments of this disclosure.

FIG. 25 illustrates example mapping operations according to embodiments of this disclosure. The operations may be performed by one or more components or modules (e.g., event handlers, operations, logic, methods, etc.) of the generic adapter 1734 and/or the representations of the federated systems. In the depicted example, an event request message with a payload may be received having any suitable type of message format, such as JSON, XML, or AML. The computer-implemented system 1718 may deserialize the payload into a normalized data object 2500. The normalized data object may include various item types and properties that are mapped to logical model type (LMT) item types of the self-describing data model. For example, BOM collection in the FS_Part_DTO (normalized data object) is mapped to the BOM collection property of a Part item.

Figure 26:
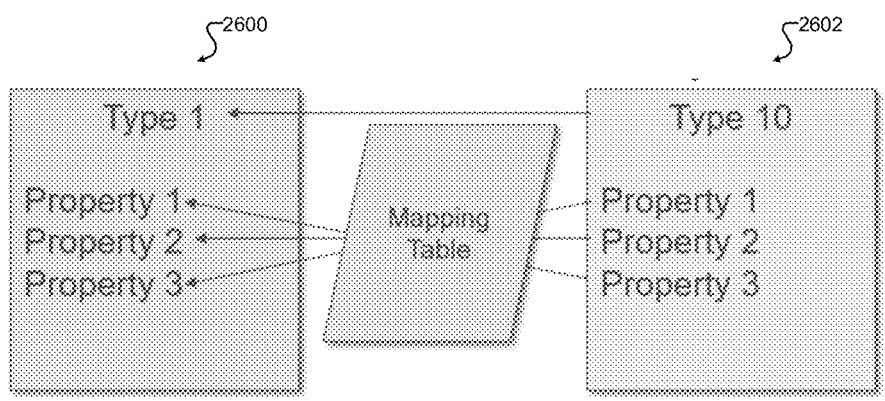
FIG. 26 illustrates additional example mapping operations according to embodiments of this disclosure.

FIG. 26 illustrates additional example mapping operations according to embodiments of this disclosure. The depicted example shows that an item type 2600 in the self-describing data model may be mapped to an item type 2602 of an external object model of a federated system. Further, the disclosed embodiments enable property to property mappings using a mapping table. It should be noted that multiple item types may be mapped into a single item type, a single item type may be mapped into multiple item types, and a single item type may be mapped in to a single item type. The mapping definitions may be stored as mapping item types in the self-describing data model. The mappings may be enabled via the graphical element-based user interface as described herein. There may be certain rules and constraints that are enforce during mapping, such as formatting, list handling, date conversions, conditional mappings, etc.

Figure 27:
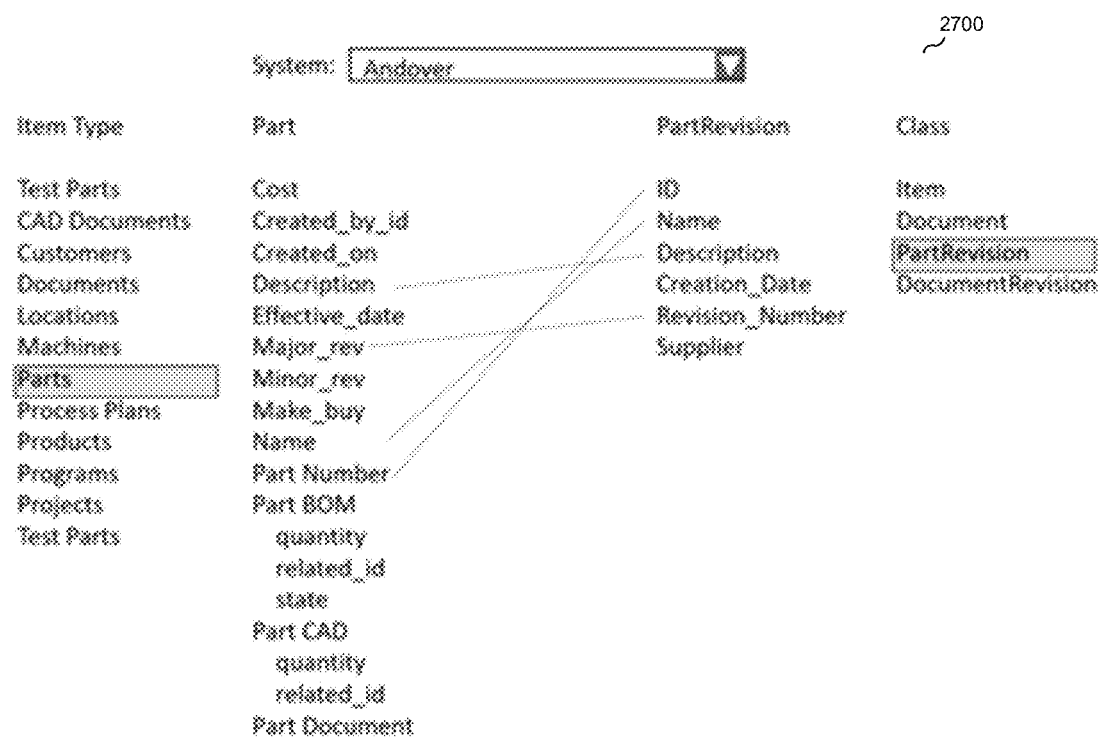
FIG. 27 illustrates an example graphic based user interface for mapping item types according to embodiments of this disclosure.

FIG. 27 illustrates an example graphic element-based user interface 2700 for mapping item types according to embodiments of this disclosure. The user interface 2700 includes selected graphical elements representing item types that may be mapped to other graphical elements representing other item types. For example, an item type of parts may include properties Description, Major_rev, Name, and Part Number. The user may use an input peripheral (e.g., mouse, keyboard, touchscreen, microphone) to select the item type parts and map its properties to properties of another item type or class (e.g., PartRevsion). As depicted, the properties of the item type "Part" and mapped to the properties (Part number mapped to ID, Name mapped to Name, Description mapped to Description, and Major_rev mapped to Revision_Number) of the class "PartRevision". These mappings may be stored in mapping item types within a representation of a federated system stored in the self-describing data model. The mapping item types may be used to enable communication of data between the computer-implemented system 1718 and one or more third-party computer-implemented systems.

Figure 28:
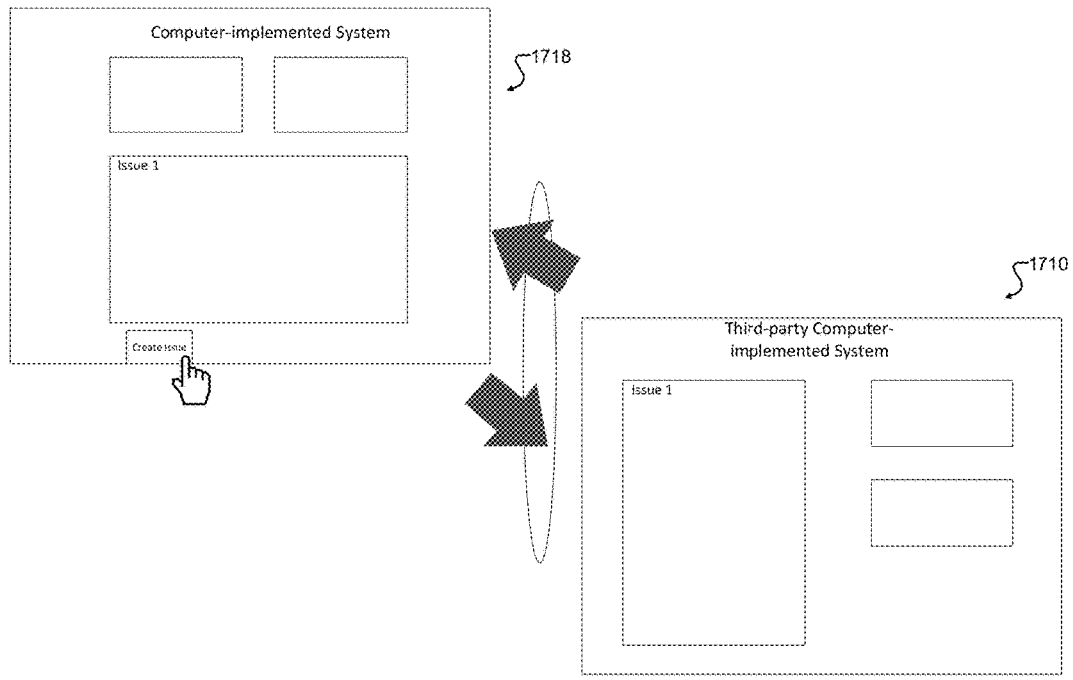
FIG. 28 illustrates example synchronization and replication operations performed between a computer-implemented system and a third-party implemented system according to embodiments of this disclosure.

FIG. 28 illustrates example synchronization and replication operations performed between a computer-implemented system and a third-party implemented system according to embodiments of this disclosure. As depicted, the client computer-implemented system 1702 may provide a front-end of the computer-implemented system 1718 that manages items (e.g., parts) for an enterprise (e.g., automobile manufacturer). The computer-implemented system 1718 may be integrated with an issue management system, such as the third-party computer-implemented system 1710. The depicted example may use any of the disclosed embodiments to enable real-time (e.g., less than 5 seconds) sharing of local data associated with the computer-implemented system 1718 and federated data associated with the third-party computer-implemented system 1710. For example, the user of the client computer-implemented system 1702 may create a new issue (Issue 1) for a particular part in the user interface and click a graphical element (e.g., Create Issue button). The selection of the button may cause an update request to be transmitted from the client computer-implemented system 1702 to the computer-implemented system 1718. The computer-implemented system 1718 may use the mappings stored in the self-describing data model to map the data in the request to associated federated data and call an API of the third-party computer-implemented system 1710 to create the data in its external object model. As depicted, the newly created issue is presented in the user interface of the third-party computer-implemented system 1710.

Figure 29:
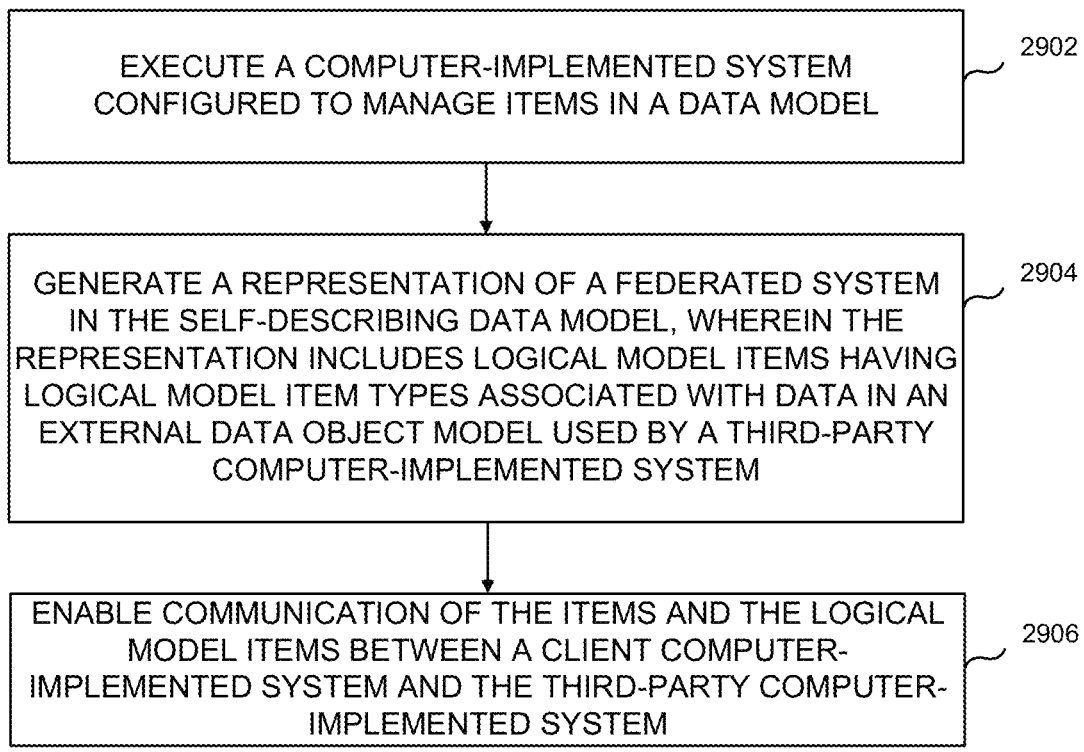
FIG. 29 illustrates example operations of a method for using a representation of a federated system to enable communication between a client computer-implemented system and a third-party computer-implemented system according to embodiments of this disclosure.

FIG. 29 illustrates example operations of a method 2900 for using a representation of a federated system to enable communication between a client computer-implemented system and a third-party computer-implemented system according to embodiments of this disclosure. The method 2900 is performed by processing logic that may include hardware (circuitry, dedicated logic, etc.), software (such as is run on a general purpose computer system or a dedicated machine), or a combination of both. The method 2900 and/or each of their individual functions, routines, subroutines, or operations may be performed by one or more processors of a computing device (e.g., any component of FIG. 4 or FIG. 17, such as the computing device 1704, the client computing device 1700, the third-party computing device 1705, etc.). In certain implementations, the method 2900 may be performed by a single processing thread. Alternatively, the method 2900 may be performed by two or more processing threads, each thread implementing one or more individual functions, routines, subroutines, or operations of the methods.

For simplicity of explanation, the method 2900 is depicted and described as a series of operations. However, operations in accordance with this disclosure can occur in various orders and/or concurrently, and with other operations not presented and described herein. For example, the operations depicted in the method 2900 may occur in combination with any other operation of any other method disclosed herein. Furthermore, not all illustrated operations may be required to implement the method 2900 in accordance with the disclosed subject matter. In addition, those skilled in the art will understand and appreciate that the method 2900 could alternatively be represented as a series of interrelated states via a state diagram or events.

At 2902, the processing device may execute a computer-implemented system configured to manage items in a data model. In some embodiments, the computer-implemented system may be configured to manage items in a self-describing data model. In some embodiments, the computer-implemented system may be configured to manage items in a hierarchical data model.

At 2904, the processing device may generate a representation (e.g., a logical model item having a logical model item type representing a federated, third-party computer-implemented system) of a federated system in the self-describing data model. The representation may include logical model items having logical model item types associated with data in an external object model used by a third-party computer-implemented system. In some embodiments, a data format of data in the external object model and a data format in the self-describing data model are different. In some embodiments, the representation of the federated system may include (i) the logical model item types that may be associated with item types of the data of the external object model, (ii) one or more logical model properties that are associated with one or more properties of the external object model, and (iii) a relationship item type that references the third-party computer-implemented system executing on a third-party computing device (e.g., via an identifier of the third-party computer-implemented system).

In some embodiments, generating the representation of the federated system in the self-describing data model may include determining a mapping of item types included in the external object model of the third-party computer-implemented system to the logical model item types in the self-describing data model of the computer-implemented system. In some embodiments, the self-describing data model may include mapping item types that define the mapping. In some embodiments, the mapping of the external object model of the third-party computer-implemented system to the self-describing data model is generated using a graphical element based user interface presented by the client computer-implemented system. The client computer-implemented system may be a standalone client-side software application implemented in computer instructions stored on a memory device of a client computing device and executed by a processing device of the client computing device. In some embodiments, the client computer-implemented system may be executed in another application, such as a website executing in a web browser.

At block 2906, the processing device may enable communication of the items and the logical model items between a client computer-implemented system and the third-party computer-implemented system.

In some embodiments, the processing device executes a federated system event hooks module configured to receive information pertaining to one or more events from the third-party computer-implemented system. The one or more events pertain to data object creation, data object update, data object deletion, data lifecycle change, or some combination thereof. For example, the third-party computer-implemented system may modify data in its external data object model by adding a new data object and the application programming interface executed by the third-party computer-implemented system may transmit a message indicative of the data modification event to any subscribed computer-implemented systems. The message may include authentication and/or connection information (e.g., internet protocol (IP) address, universal resource locator (URL), etc.) pertaining to the subscribed computer-implemented systems, such that the message is transmitted to the right address.

In some embodiments, the representation of the federated service may include various operation item types that are configured to deserialize a data object associated with the external object model. The data object may be included in a request transmitted from the third-party computer-implemented system, and the data object may be deserialized into a normalized data object. For example, certain item types in the data object of the external object model may be mapped to certain item types in the normalized data object. These mappings may be stored as mapping item types in the self-describing data model. Properties of item types of the data object of the external object model may also be mapped to properties of item types of the normalized data object. Further, mappings between the item types and/or properties of the normalized data object and the item types and/or properties of logical model items of the representation of the federated system may be stored as mapping item types in the self-describing data model. Using the mapping item types, the normalized data object may enabling transforming data in a first data format to a second format, such that the computer-implemented system can generate a representation of the federation systems in the self-describing data model and be integrated with any suitable federation system's external object models. In some embodiments, a generic adapter is configured to map the normalized data object to one or more corresponding item types (e.g., logical model item types associated with the third-party computer-implemented system, item types associated with the computer-implemented system, or both) in the self-describing data model.

The representation of the federated system may include various other operation item types that are defined based on an application programming interface (API) exposed by the third-party computer-implemented system. For example, the operation item type may specify a service path or a uniform resource locator (URL) of the API. The API may be defined as a set of specifications, such as Hypertext Transfer Protocol (HTTP) request messages, along with a definition of the structure of response messages. The request messages and/or response messages may be an Extensible Markup Language (XML) or JavScript Object Notation (JSON) format.

In some embodiments, the computer-implemented system is configured to execute a generic adapter to perform one or more synchronization operations, replication operations, or both. The computer-implemented system may use the representation of the federated system in the self-describing data model and the external object model, among other data (e.g., items associated with different representations of different federated systems, items associated with the computer-implemented system, etc.) when performing the synchronization and/or replication operations. The synchronization operation may include synchronizing data stored in the self-described data model and the external object model of the federated system. For example, the items included in the representation of the federated system in the self-described data model may be synchronized with corresponding items in external object model. The replication operation may include replicating data from the self-describing data model to the external object model or vice versa.

In some embodiments, the computer-implemented system is configured to perform one or more live data integration operations using the data from the external object model. For example, a client computer-implemented system may request data pertaining to a federated system.

The computer-implemented system may perform, using the representation of the federated system in the self-describing data model, one or more operations to request the data from the federated system. The data of the federated system may be returned, via the computer-implemented system, to the client computer-implemented system for presentation on a user interface. The data may be live data such that the data is not persisted by the computer-implemented system while acting as a conduit for the data between the client computer-implemented system and the federated system. The client computer-implemented system may perform an override operation by requesting to modify the live data that is presented via the user interface. The computer-implemented system may receive the request, perform mapping operations to transform the request into a format acceptable by the federated system, and transmit the new request to the federated system to cause the modified data to be persisted by the federated system. In some embodiments, the computer-implemented system may not persist the modification to the data. In some embodiments, the computer-implemented system may persist the modification to the data during a synchronization and/or replication operation.

In some embodiments, the computer-implemented system may be configured to execute a generic adapter configured to determine the mapping using a workflow engine that executes one or more workflows that search for corresponding items between the self-describing data model and the external object model. The workflows may include a series of linear or non-linear operations to search for item types included in the external object model, the representation of the federated system, and/or the normalized data object to perform mapping operations.

Figure 30:
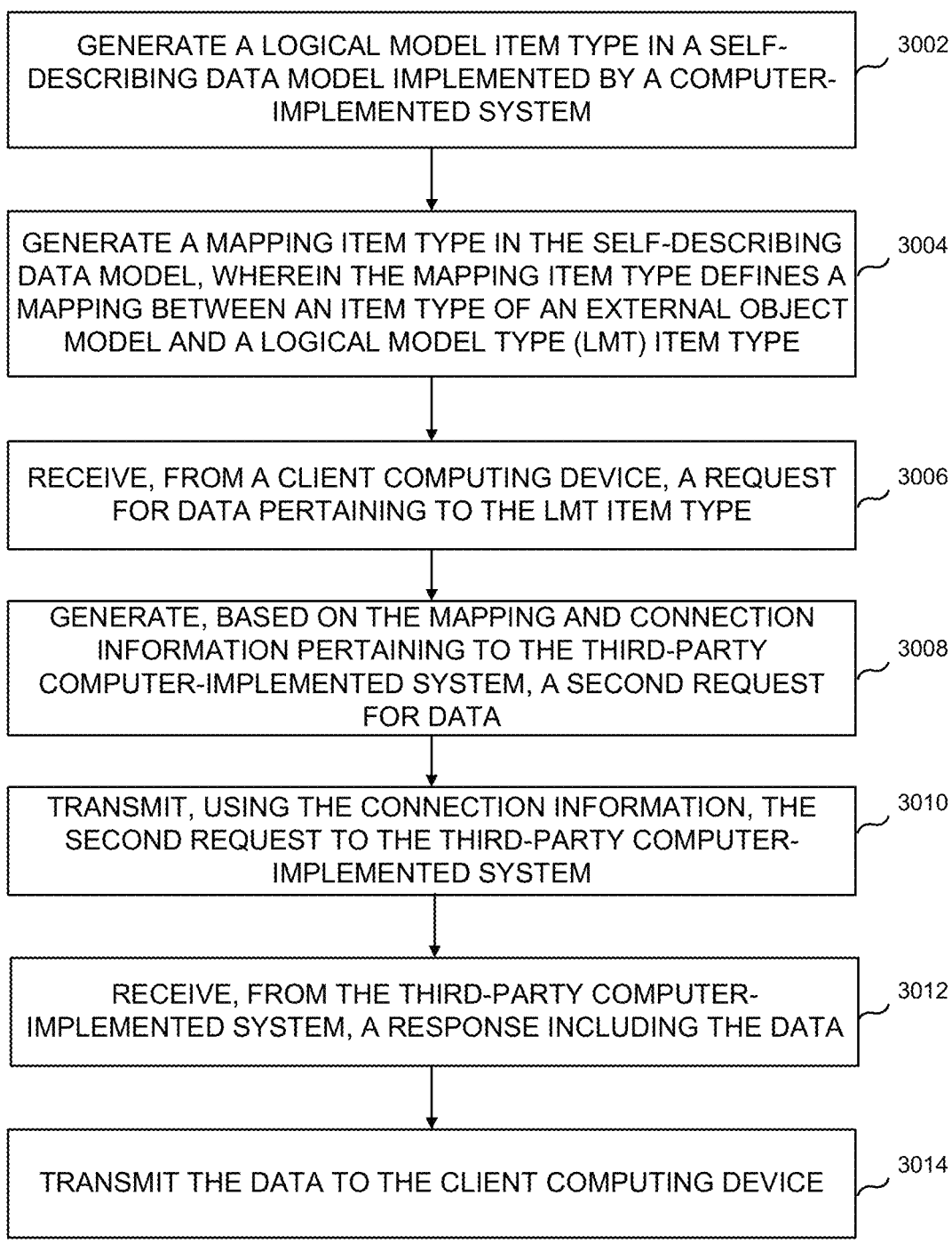
FIG. 30 illustrates example operations of a method for using a computer-implemented system to aggregate data according to embodiments of this disclosure.

FIG. 30 illustrates example operations of a method 3000 for using a computer-implemented system to aggregate data according to embodiments of this disclosure. The method 3000 is performed by processing logic that may include hardware (circuitry, dedicated logic, etc.), software (such as is run on a general purpose computer system or a dedicated machine), or a combination of both. The method 3000 and/or each of their individual functions, routines, subroutines, or operations may be performed by one or more processors of a computing device (e.g., any component of FIG. 4 or FIG. 17, such as the computing device 1704, the client computing device 1700, the third-party computing device 1705, etc.). In certain implementations, the method 3000 may be performed by a single processing thread. Alternatively, the method 3000 may be performed by two or more processing threads, each thread implementing one or more individual functions, routines, subroutines, or operations of the methods.

For simplicity of explanation, the method 3000 is depicted and described as a series of operations. However, operations in accordance with this disclosure can occur in various orders and/or concurrently, and with other operations not presented and described herein. For example, the operations depicted in the method 3000 may occur in combination with any other operation of any other method disclosed herein. Furthermore, not all illustrated operations may be required to implement the method 3000 in accordance with the disclosed subject matter. In addition, those skilled in the art will understand and appreciate that the method 3000 could alternatively be represented as a series of interrelated states via a state diagram or events.

It should be noted that method 3000 describes an embodiment where a client computing device requests data pertaining to a federated system that has been integrated with the computer-implemented system; however, one or more of the operations (below) may be similarly performed when a federated system requests data pertaining to the computer-implemented system.

At block 3002, the processing device may generate a logical model item type in a self-describing data model implemented by the computer-implemented system. The terms "logical model item type" and "representation of a federated system" may be used interchangeably herein. The logical model item type may define a data schema of an external object model implemented by a third-party computer-implemented system executed by a third-party computing device. The data schema may refer to organization of data within a data structure, such as the external object model, and may enforce certain integrity constraints and/or rules for which data can be entered into which fields of the data structure. The logical model item type may include a logical model type (LMT) item type representing data of the third-party computer-implemented system. The LMT item type may define logical model type items in the self-describing data model that are associated with certain data in the external object model of the federated system.

At block 3004, the processing device may generate a mapping item type in the self-describing data model. The mapping item type may define a mapping between an item type of the external object model and the LMT item type. In some embodiments, the mapping between the item type of the external object moel and the LMT item type is generated using a graphical element-based user interface presented at the client computing device.

At block 3006, the processing device may receive, from a client computing device, a request for data pertaining to the LMT item type. At block 3008, the processing device may generate, based on the mapping and connection information pertaining to the third-party computer- implemented system, a second request for the data. At block 3010, the processing device may transmit, using the connection information, the second request to the third-party computer-implemented system. At block 3012, the processing device may receive, from the third-party computer-implemented system, a response including the data. In a live data integration embodiment, the computer-implemented system may not persist the data when its received from the third-party computer-implemented system.

At block 3014, the processing device may transmit the data to the client computing device. In some embodiments, the data is presented on a user interface of the client computing device. In some embodiments, the computer-implemented system may receive from the client computing device, an override request including a modification to the data. The computer-implemented system may use the mapping to transform the modification of the data to create a message having a format compatible with the third-party computer-implemented system. In some embodiments, the modification to the data is not persisted at the computer-implemented system. In some embodiments, the computer-implemented system may transmit the message to the third-party computer-implemented system, such that the data is updated with the modification at the third-party computer-implemented system.

In some embodiments, the computer-implemented system may generate a federated system item type in the self-describing data model. The federated system item type may define information pertaining to the third-party computer-implemented system, and the information may include an identity of the third-party computer-implemented system, an authentication protocol of the third-party computer-implemented system, and/or connection information (e.g., internet protocol (IP) address, universal resource locator (URL), port number, etc.). The federated system item type may include a reference (e.g., identifier) to the third-party computer-implemented system. The logical model item type may be logically bound to the federation system item type to read the connection information, authentication protocol, and the like. For example, the logical model item type may include a property for a relationship with the federated system item type that enables logically binding the two item types.

In some embodiments, the computer-implemented system may execute an adapter (e.g., generic adapter) to obtain the authentication protocol and the connection information from a related federated system item type in the self-describing data model. The computer-implemented system may generate and transmit the second request based on the authentication protocol and the connection information.

In some embodiments, when the request is received, the computer-implemented system may load local items (e.g., where local items may refer to items specific to the computer-implemented system) associate with the LMT item type referenced in the request. When the response is received from the third-party computer-implemented system, the local data may be merged with the data in the response to form merged data. In some embodiments, the merged data may be transmitted to the client computing device.

Figure 31:
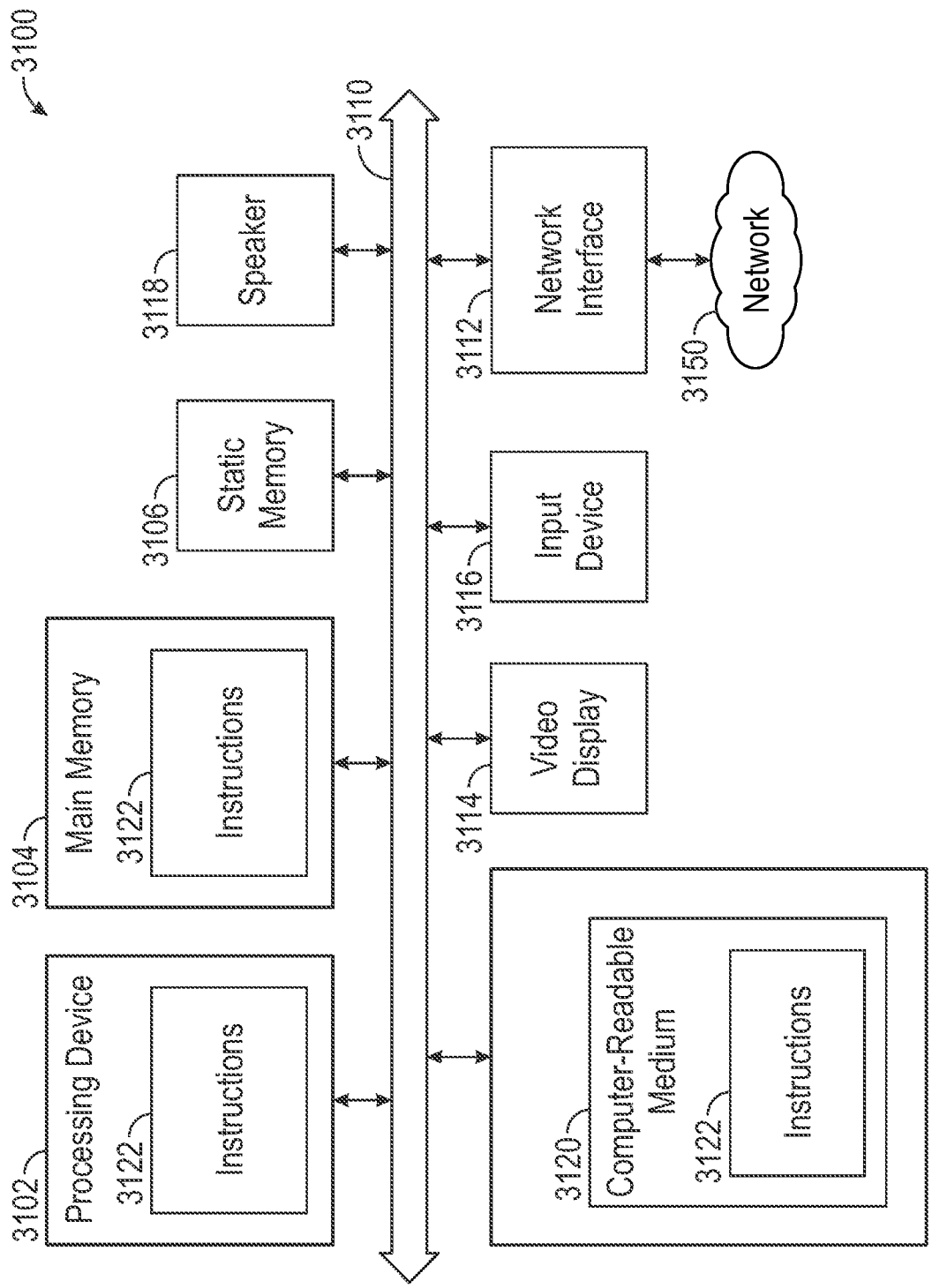
FIG. 31 illustrates an example computer.

FIG. 31 shows an example computer system 3100 which can perform any one or more of the methods described herein, in accordance with one or more aspects of the present disclosure. In one example, computer system 3100 may include a computing device and correspond to the client computing device 1700, the computing device 1704, the third-party computing device 1705, or any other computing device described herein, or any suitable component of FIG. 4 or FIG. 17. The computer system may be connected (e.g., networked) to other computer systems in a LAN, an intranet, an extranet, or the Internet, including via the cloud or a peer-to-peer network. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 3100 includes a processing device 3102, a main memory 3104 (e.g., read-only memory (ROM), flash memory, solid state drives (SSDs), dynamic random access memory (DRAM) such as synchronous DRAM (SDRAM)), a static memory 3106 (e.g., flash memory, solid state drives (SSDs), static random access memory (SRAM)), and a data storage device 3108, which communicate with each other via a bus 3110.

Processing device 3102 represents one or more general-purpose processing devices such as a microprocessor, central processing unit, or the like. More particularly, the processing device 3102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 3102 may also be one or more special-purpose processing devices such as an application specific integrated circuit (ASIC), a system on a chip, a field programmable gate array (FPGA), a digital signal processor (DSP), network processor, or the like. The processing device 3102 is configured to execute instructions for performing any of the operations and steps discussed herein.

The computer system 3100 may further include a network interface device 3112. The computer system 3100 also may include a video display 3114 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 1116 (e.g., a keyboard and/or a mouse or a gaming-like control), and one or more speakers 3118 (e.g., a speaker). In one illustrative example, the video display 3114 and the input device(s) 3116 may be combined into a single component or device (e.g., an LCD touch screen).

The data storage device 3116 may include a computer-readable medium 3120 on which the instructions 3122 embodying any one or more of the methods, operations, or functions described herein is stored. The instructions 3122 may also reside, completely or at least partially, within the main memory 3104 and/or within the processing device 3102 during execution thereof by the computer system 3100. As such, the main memory 3104 and the processing device 3102 also constitute computer-readable media. The instructions 3122 may further be transmitted or received over a network via the network interface device 3112.

While the computer-readable storage medium 3120 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Clauses:
Clause 1. A computing device comprising:
a memory device storing instructions; and
a processing device communicatively coupled to the memory device, wherein the processing device executes the instructions to:
execute a computer-implemented system configured to manage items in a self-describing data model;
generate a representation of a federated system in the self-describing data model, wherein the representation includes logical model items having logical model item types associated with data in an external object model used by a third-party computer-implemented system;
enable communication of the items and the logical model items between a client computer-implemented system and the third-party computer-implemented system.

Clause 2. The computing device of any preceding clause, wherein generating the representation of the federated system in the self-describing data model further comprises determining a mapping of item types included in the external object model of the third-party computer-implemented system to the logical model item types in the self-describing data model of the computer-implemented system.

Clause 3. The computing device of any preceding clause, wherein the mapping of the external object model of the third-party computer-implemented system to the self-describing data model is generated using a graphical element based user interface presented by the client computer-implemented system.

Clause 4. The computing device of any preceding clause, wherein the self-describing data model comprises mapping item types that define the mapping.

Clause 5. The computing device of claim 1, wherein the processing device is further to execute a federated system event hooks module configured to receive information pertaining to one or more events from the third-party computer-implemented system, wherein the one or more events pertain to data object creation, data object update, data object deletion, data lifecycle change, or some combination thereof.

Clause 6. The computing device of any preceding clause, wherein an operation item type in the representation is configured to:
deserialize a data object associated with the external object model, wherein the data object is included in a request from the third-party computer-implemented system, and the data object is deserialized into a normalized data object, and
a generic adapter is configured to map the normalized data object to one or more corresponding item types in the self-describing data model.

Clause 7. The computing device of any preceding clause, wherein the representation comprises:
the logical model item types that are associated with item types of the data of the external object model,
one or more logical model properties that are associated with one or more properties of the external object model, and
a relationship item type that references the third-party computer-implemented system executing on the third-party computing device.

Clause 8. The computing device of any preceding clause, wherein the representation comprises at least one operation item type that is defined based on an application programming interface (APIs) exposed by the third-party computer system.

Clause 9. The computing device of claim 1, wherein a data format of data in the external object model and a data format of data in the self-describing data model are different.

Clause 10. The computing device of any preceding clause, wherein the computer-implemented system is configured to execute a generic adapter to, using the representation of the federated system in the self-describing data model and the external object model, perform one or more synchronization operations, replication operations, or both.

Clause 11. The computing device of any preceding clause, wherein the computer-implemented system is configured to perform one or more live data integration operations using the data from the external object model.

Clause 12. The computing device of any preceding clause, wherein the computer-implemented system is configured to execute a generic adapter configured to determine the mapping using a workflow engine that executes one or more workflows that search for corresponding items between the self-describing data model and the external object model.

Clause 13. A computer-implemented method comprising:
  executing a computer-implemented system configured to manage items in a self-describing data model;
  generating a representation of a federated system in the self-describing data model, wherein the representation includes logical model items having logical model item types associated with data in an external object model used by a third-party computer-implemented system;
  enabling communication of the items and the logical model items between a client computer-implemented system and the third-party computer-implemented system.

Clause 14. The computer-implemented method of any preceding clause, wherein generating the representation of the federated system in the self-describing data model further comprises determining a mapping of item types included in the external object model of the third-party computer-implemented system to the logical model item types in the self-describing data model of the computer-implemented system.

Clause 15. The computer-implemented method of any preceding clause, wherein the mapping of the external object model of the third-party computer-implemented system to the self-describing data model is generated using a graphical element based user interface presented by the client computer-implemented system.

Clause 16. The computer-implemented method of any preceding clause, wherein the self-describing data model comprises mapping item types that define the mapping.

Clause 17. The computer-implemented method of any preceding clause, further comprising executing a federated system event hooks module configured to receive information pertaining to one or more events from the third-party computer-implemented system, wherein the one or more events pertain to data object creation, data object update, data object deletion, data lifecycle change, or some combination thereof.

Clause 18. The computer-implemented method of any preceding clause, further comprising:
  receiving a request from the third-party computer-implemented system;
  deserializing, using an operation item type in the self-describing data model, a data object associated with the external object model, wherein the data object is included in the request from the third-party computer-implemented system, and the data object is deserialized into a normalized data object, and
  mapping the normalized data object to one or more corresponding item types in the self-describing data model.

Clause 19. The computer-implemented method of any preceding clause, wherein the representation comprises:
  the logical model item types that are associated with item types of the data of the external object model,
  one or more logical model properties that are associated with one or more properties of the external object model, and
  a relationship item type that references the third-party computer-implemented system executing on the third-party computing device.

Clause 20. A tangible, non-transitory computer-readable medium storing instructions that, when executed, cause a processing device to:
  execute a computer-implemented system configured to manage items in a self-describing data model;
  generate a representation of a federated system in the self-describing data model, wherein the representation includes logical model items having logical model item types associated with data in an external object model used by a third-party computer-implemented system;
  enable communication of the items and the logical model items between a client computer-implemented system and the third-party computer-implemented system.

Clause 21. A computing device comprising:
  a computer-implemented system executed by the computing device, wherein the computer-implemented system is configured to:
  generate a logical model item type in a self-describing data model implemented by the computer-implemented system, wherein:
    the logical model item type defines a schema of an external object model implemented by a third-party computer-implemented system executed by a third-party computing device;
    the logical model item type comprises a logical model type (LMT) item type representing data of the third-party computer-implemented system;
  generate a mapping item type in the self-describing data model, wherein the mapping item type defines a mapping between an item type of the external object model and the LMT item type;
  receive, from a client computing device, a request for data pertaining to the LMT item type;
  generate, based on the mapping and connection information pertaining to the third-party computer-implemented system, a second request for the data;
  transmit, using the connection information, the second request to the third-party computer-implemented system;
  receive, from the third-party computer-implemented system, a response including the data; and
  transmit the data to the client computing device.

Clause 22. The computing device of claim 1, wherein the computer-implemented system is further to generate a federated system item type in the self-describing data model, wherein the federated system item type defines information pertaining to the third-party computer-implemented system, and the information comprises an identity of the third-party computer-implemented system, an authentication protocol of the third-party computer-implemented system, and the connection information.

Clause 23. The computing device of claim 2, wherein the computer-implemented system is further configured to:

execute an adapter to obtain the authentication protocol and the connection information from the federated system item type, and generate the second request based on the authentication protocol and the connection information.

Clause 24. The computing device of claim 1, wherein, when the request is received, the computer-implemented system is further to:

load local items associated with the LMT item type referenced in the request, when the response is received, merge the local data and the data into merged data, and transmit the merged data to the client computing device.

Clause 25. The computing device of claim 4, wherein the computer-implemented system does not persist the data at the computing device, and the data is presented in a user interface of the client computing device.

Clause 26. The computing device of claim 5, wherein the computer-implemented system is further to:

receive, from the client computing device, an override request comprising a modification to the data;

use the mapping to transform the modification to the data to create a message having a format compatible with the third-party computer-implemented system, wherein the modification to the data is not persisted by the computer-implemented system; and transmit the message to the third-party computer-implemented system such that the data is updated with the modification at the third-party computer-implemented system.

Clause 27. The computing device of claim 1, wherein the mapping between the item type of the external object model and the LMT item type is generated using a graphical element-based user interface presented at the client computing device.

Clause 28. The computing device of claim 1, wherein a data format of data in the external object model and a data format of data in the self-describing data model are different.

Clause 29. The computing device of claim 1, wherein an operation item type in the self-describing data model is configured to:

deserialize a data object associated with the external object model, wherein the data object includes the item type, is included in the request, and the item type is deserialized into a normalized data object, and use the mapping to map the item type included in the normalized data object to LMT item type in the self-describing data model.

Clause 30. The computing device of claim 1, wherein the computer-implemented system is further to execute a federated system event hooks module configured to receive information pertaining to one or more events from the third-party computer-implemented system, wherein the one or more events pertain to data object creation, data object update, data object deletion, data lifecycle change, or some combination thereof.

Clause 31. A computer-implemented method comprising:

generating a logical model item type in a self-describing data model implemented by a computer-implemented system, wherein:

the logical model item type defines a schema of an external object model implemented by a third-party computer-implemented system executed by a third-party computing device;

the logical model item type comprises a logical model type (LMT) item type representing data of the third-party computer-implemented system;

generating a mapping item type in the self-describing data model, wherein the mapping item type defines a mapping between an item type of the external object model and the LMT item type;

receiving, from a client computing device, a request for data pertaining to the LMT item type;

generating, based on the mapping and connection information pertaining to the third-party computer-implemented system, a second request for the data;

transmitting, using the connection information, the second request to the third-party computer-implemented system;

receiving, from the third-party computer-implemented system, a response including the data; and transmitting the data to the client computing device.

Clause 32. The computer-implemented method of claim 11, further comprising generating a federated system item type in the self-describing data model, wherein the federated system item type defines information pertaining to the computer-implemented system, and the information comprises an identity of the computer-implemented system, an authentication protocol of the computer-implemented system, and the connection information.

Clause 33. The computer-implemented method of claim 12, further comprising:

executing an adapter to obtain the authentication protocol and the connection information from the federated system item type, and generating the second request based on the authentication protocol and the connection information.

Clause 34. The computer-implemented method of claim 11, wherein, when the request is received, the method further comprises:

loading local items associated with the LMT item type referenced in the request, when the response is received, merging the local data and the data into merged data, and transmitting the merged data to the client computing device.

Clause 35. The computer-implemented method of claim 14, wherein the computer-implemented system does not persist the data at the computing device, and the data is presented in a user interface of the client computing device.

Clause 36. The computer-implemented method of claim 15, further comprising:

receiving, from the client computing device, an override request comprising a modification to the data;

using the mapping to transform the modification to the data to create a message having a format compatible with the third-party computer-implemented system, wherein the modification to the data is not persisted at the computing device; and transmitting the message to the third-party computer-implemented system. data to the client computing device.

Clause 37. The computer-implemented method of claim 11, wherein the mapping between the item type of the external object model and the LMT item type is generated using a graphical element-based user interface presented at the client computing device.

Clause 38. The computer-implemented method of claim 11, wherein a data format of data in the external object model and a data format of data in the self-describing data model are different.

Clause 39. The computer-implemented method of claim 11, further comprising:
  deserializing, using an operation item type in the self-describing data model, a data object associated with the external object model, wherein the data object includes the item type, is included in the request, and the item type is deserialized into a normalized data object, and
  using the mapping to map the item type included in the normalized data object to LMT item type in the self-describing data model.

Clause 40. A tangible, non-transitory computer-readable medium storing instructions that, when executed, cause a processing device to:
  generate a logical model item type in a self-describing data model implemented by a computer-implemented system, wherein:
  the logical model item type defines a schema of an external object model implemented by a third-party computer-implemented system executed by a third-party computing device;
  the logical model item type comprises a logical model type (LMT) item type representing data of the third-party computer-implemented system;
  generate a mapping item type in the self-describing data model, wherein the mapping item type defines a mapping between an item type of the external object model and the LMT item type;
  receive, from a client computing device, a request for data pertaining to the LMT item type;
  generate, based on the mapping and connection information pertaining to the third-party computer-implemented system, a second request for the data;
  transmit, using the connection information, the second request to the third-party computer-implemented system;
  receive, from the third-party computer-implemented system, a response including the data; and
  transmit the data to the client computing device.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computing device comprising:
  a memory storing instructions; and
  a processing device communicatively coupled to the memory device, wherein the processing device executes the instructions to:
  execute a computer-implemented system configured to manage items in a self-describing data model;
  generate a representation of a federated system in the self-describing data model, wherein the representation includes logical model items having logical model item types associated with data in an external object model used by a third-party computer-implemented system, and
  wherein the computer-implemented system is configured to execute a generic adapter configured to determine a mapping of item types included in the external object model to the logical model item types in the self-describing data model using a workflow engine that executes one or more workflows, wherein the one or more workflows search for corresponding items between the self-describing data model and the external object model and generate the mapping based on the corresponding items and a graphical element of a user interface presented by a device;
  wherein the generating the mapping includes deserializing, by an operation item type in the representation, a data object associated with the external object model, wherein the data object is included in a request from the third-party computer-implemented system, and the data object is deserialized into a normalized data object; and
  mapping, by a generic adapter, the normalized data object to one or more corresponding item types in the self-describing data model;
  transform, using the mapping, data received from the external object model from a first format to a second format compatible with the self-describing data model; and
  enable, based on the transformed data, communication of the corresponding items and the logical model items between a client computer-implemented system and the third-party computer-implemented system to perform operations for various events triggered by the client computer-implemented system.

2. The computing device of claim 1, wherein the generating the representation of the federated system in the self-describing data model further comprises determining the mapping of item types included in the external object model of the third-party computer-implemented system to the logical model item types in the self-describing data model of the computer-implemented system.

3. The computing device of claim 2, wherein the mapping of the external object model of the third-party computer-implemented system to the self-describing data model is generated using a graphical element based on user interface presented by the client computer-implemented system.

4. The computing device of claim 2, wherein the self-describing data model comprises mapping item types that define the mapping.

5. The computing device of claim 1, wherein the processing device is further to execute a federated system event hooks module to receive information pertaining to one or more events from the third-party computer-implemented system, wherein the one or more events pertain to data object creation, data object update, data object deletion, data lifecycle change, or some combination thereof.

6. The computing device of claim 1, wherein the representation comprises: the logical model item types that are associated with item types of the data of the external object model, one or more logical model properties that are associated with one or more properties of the external object model, and a relationship item type that references the third-party computer-implemented system executing on the third-party computing device.

7. The computing device of claim 1, wherein the representation comprises at least one operation item type that is defined based on an application programming interfaces (APIs) exposed by the third-party computer-implemented system.

8. The computing device of claim 1, wherein a data format of data in the external object model and a data format of data in the self-describing data model are different.

9. The computing device of claim 1, wherein the computer-implemented system is configured to execute a generic adapter to, using the representation of the federated system in the self-describing data model and the external object model, perform one or more synchronization operations, replication operations, or both.

10. The computing device of claim 1, wherein the computer-implemented system is configured to perform one or more live data integration operations using the data from the external object model.

11. A computer-implemented method comprising:
executing a computer-implemented system configured to manage items in a self-describing data model;
generating, by the computer-implemented system, a representation of a federated system in the self-describing data model, wherein the representation includes logical model items having logical model item types associated with data in an external object model used by a third-party computer-implemented system, and
wherein the computer-implemented system is configured to execute a generic adapter configured to determine a mapping of item types included in the external object model to the logical model item types in the self-describing data model using a workflow engine that executes one or more workflows, wherein the one or more workflows search for corresponding items between the self-describing data model and the external object model and generating the mapping based on the corresponding items and a graphical element of user interface presented by a client computer-implemented system;
wherein the generating the mapping includes deserializing, by an operation item type in the representation, a data object associated with the external object model, wherein the data object is included in a request from the third-party computer-implemented system, and the data object is deserialized into a normalized data object; and
mapping, by a generic adapter, the normalized data object to one or more corresponding item types in the self-describing data model;
transforming, by the computer-implemented system using the mapping, data received from the external object model from a first format to a second format compatible with the self-describing data model; and
enabling, by the computer-implemented system based on the transformed data, communication of the corresponding items and the logical model items between the client computer-implemented system and the third-party computer-implemented system to perform operations for various events triggered by the client computer-implemented system.

12. The computer-implemented method of claim 11, wherein generating the representation of the federated system in the self-describing data model further comprises determining the mapping of item types included in the external object model of the third-party computer-implemented system to the logical model item types in the self-describing data model of the computer-implemented system.

13. The computer-implemented method of claim 10, wherein the mapping of the external object model of the third-party computer-implemented system to the self-describing data model is generated using a graphical element based on user interface presented by the client computer-implemented system.

14. The computer-implemented method of claim 10, wherein the self-describing data model comprises mapping item types that define the mapping.

15. The computer-implemented method of claim 11, further comprising executing a federated system event hooks module to receive information pertaining to one or more events from the third-party computer-implemented system, wherein the one or more events pertain to data object creation, data object update, data object deletion, data lifecycle change, or some combination thereof.

16. The computer-implemented method of claim 11, wherein the representation comprises: the logical model item types that are associated with item types of the data of the external object model, one or more logical model properties that are associated with one or more properties of the external object model, and a relationship item type that references the third-party computer-implemented system executing on a third-party computing device.

17. A tangible, non-transitory computer-readable medium storing instructions that, when executed, cause a processing device to:
execute a computer-implemented system configured to manage items in a self-describing data model;
generate a representation of a federated system in the self-describing data model, wherein the representation includes logical model items having logical model item types associated with data in an external object model used by a third-party computer-implemented system, and
wherein the computer-implemented system is configured to execute a generic adapter configured to determine a mapping of item types included in the external object model to the logical model item types in the self-describing data model using a workflow engine that executes one or more workflows, wherein the one or more workflows search for corresponding items between the self-describing data model and the external object model and generating the mapping based on the corresponding items and a graphical element of user interface presented by a client computer-implemented system;
wherein the generating the mapping includes deserializing, by an operation item type in the representation, a data object associated with the external object model, wherein the data object is included in a request from the third-party computer-implemented system, and the data object is deserialized into a normalized data object; and
mapping, by a generic adapter, the normalized data object to one or more corresponding item types in the self-describing data model;
transform, using the mapping, data received from the external object model from a first format to a second format compatible with the self-describing data model; and
enable, based on the transformed data, communication of the corresponding items and the logical model items between the client computer-implemented system and the third-party computer-implemented system to perform operations for various events triggered by the client computer-implemented system.

* * * * *